US007668653B2

(12) United States Patent
Habaguchi

(10) Patent No.: US 7,668,653 B2
(45) Date of Patent: Feb. 23, 2010

(54) SYSTEM AND METHOD FOR SELECTIVELY FILTERING AND PROVIDING EVENT PROGRAM INFORMATION

(75) Inventor: Masayuki Habaguchi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 120 days.

(21) Appl. No.: 11/756,611

(22) Filed: May 31, 2007

(65) Prior Publication Data

US 2008/0300775 A1 Dec. 4, 2008

(51) Int. Cl.
*G01C 21/30* (2006.01)
*G01C 21/00* (2006.01)
*G06F 19/00* (2006.01)

(52) U.S. Cl. .......................... 701/209; 701/35; 701/202

(58) Field of Classification Search ................. 701/116, 701/201, 207, 209; 345/211; 340/995.1; 709/219, 216
See application file for complete search history.

(56) References Cited

U.S. PATENT DOCUMENTS 3,283,297 A 11/1966 Pfenninghausen et al.
4,404,639 A 9/1983 McGuire
4,989,146 A 1/1991 Imajo
5,173,691 A 12/1992 Sumner
5,182,555 A 1/1993 Sumner
5,303,401 A 4/1994 Duckeck et al.
5,359,529 A 10/1994 Snider
5,388,045 A 2/1995 Kamiya et al.
5,406,490 A 4/1995 Braegas
5,420,794 A 5/1995 James
5,442,553 A 8/1995 Parrillo
5,445,347 A 8/1995 Ng
5,465,088 A 11/1995 Braegas
5,506,773 A 4/1996 Takaba et al.
5,508,931 A 4/1996 Snider (Continued)

FOREIGN PATENT DOCUMENTS

DE 10 2004 017091 10/2005

(Continued)

OTHER PUBLICATIONS

"The Flawed Future of Radio" Acidus' Article Published in 2600 Magazine; Release date Jan. 15, 2003; 5 pages.

(Continued)

*Primary Examiner*—Mark Hellner
*Assistant Examiner*—Helal A Algahaim

(57) ABSTRACT

Systems and methods are provided for communicating filtered event program information and broadcasting user searchable event program information to vehicles. For example, there is provided a system for broadcasting event program information to at least one vehicle that is filtered according to the vehicle's current location. In one embodiment, the system comprises one or more antennas, a broadcast receiver unit having a data filter, and a navigational device that displays event program information by venue within a set distance from the vehicle's current location. The display further comprises multi-leveled sub-menus that provide a user with a variety of movie related information such as screening times, cast listings, movie reviews, movie trailers, etc. The system further comprises a memory buffer unit in the receiver unit that stores the vehicle's last reported location data and cross-referenced databases of movie program information periodically updated so as to minimize bandwidth requirements of the system.

16 Claims, 17 Drawing Sheets

U.S. PATENT DOCUMENTS

| | | | |
|---|---|---|---|
| 5,546,305 | A | 8/1996 | Kondo |
| 5,551,064 | A | 8/1996 | Nobbe et al. |
| 5,563,788 | A | 10/1996 | Yoon |
| 5,590,040 | A | 12/1996 | Abe et al. |
| 5,608,635 | A | 3/1997 | Tamai |
| 5,635,924 | A | 6/1997 | Tran et al. |
| 5,636,245 | A | 6/1997 | Ernst et al. |
| 5,648,768 | A | 7/1997 | Bouve |
| 5,649,300 | A | 7/1997 | Snyder et al. |
| 5,661,787 | A | 8/1997 | Pocock |
| 5,664,948 | A | 9/1997 | Dimitriadis et al. |
| 5,671,195 | A | 9/1997 | Lee |
| 5,682,525 | A | 10/1997 | Bouve et al. |
| 5,696,676 | A | 12/1997 | Takaba |
| 5,699,056 | A | 12/1997 | Yoshida |
| 5,757,645 | A | 5/1998 | Schneider et al. |
| 5,774,827 | A | 6/1998 | Smith et al. |
| 5,802,545 | A | 9/1998 | Coverdill |
| 5,842,146 | A | 11/1998 | Shishido |
| 5,862,510 | A | 1/1999 | Saga et al. |
| 5,864,305 | A | 1/1999 | Rosenquist |
| 5,878,056 | A | 3/1999 | Black et al. |
| 5,892,463 | A | 4/1999 | Hikita et al. |
| 5,898,680 | A | 4/1999 | Johnstone et al. |
| 5,911,773 | A | 6/1999 | Mutsuga et al. |
| 5,926,108 | A | 7/1999 | Wicks et al. |
| 5,928,307 | A | 7/1999 | Oshizawa et al. |
| 5,931,878 | A | 8/1999 | Chapin, Jr. |
| 5,959,577 | A | 9/1999 | Fan et al. |
| 5,964,811 | A | 10/1999 | Ishii et al. |
| 5,982,298 | A | 11/1999 | Lappenbusch et al. |
| 5,999,882 | A | 12/1999 | Simpson et al. |
| 6,032,046 | A | 2/2000 | Nakano |
| 6,073,007 | A | 6/2000 | Doyle |
| 6,078,865 | A | 6/2000 | Koyanagi |
| 6,085,146 | A | 7/2000 | Kuribayashi et al. |
| 6,111,521 | A | 8/2000 | Mulder et al. |
| 6,163,751 | A | 12/2000 | Van Roekel |
| 6,169,894 | B1 | 1/2001 | McCormick et al. |
| 6,178,378 | B1 | 1/2001 | Leibold |
| 6,195,602 | B1 | 2/2001 | Hazama et al. |
| 6,204,778 | B1 | 3/2001 | Bergan et al. |
| 6,208,932 | B1 | 3/2001 | Ohmura et al. |
| 6,208,935 | B1 | 3/2001 | Yamada et al. |
| 6,212,388 | B1 | 4/2001 | Seo |
| 6,236,330 | B1 | 5/2001 | Cohen |
| 6,240,364 | B1 | 5/2001 | Kerner et al. |
| 6,243,647 | B1 | 6/2001 | Berstis et al. |
| 6,246,320 | B1 | 6/2001 | Monroe |
| 6,253,146 | B1 | 6/2001 | Hanson et al. |
| 6,255,963 | B1 | 7/2001 | Heimann et al. |
| 6,266,607 | B1 | 7/2001 | Meis et al. |
| 6,266,608 | B1 | 7/2001 | Pertz |
| 6,292,723 | B1 | 9/2001 | Brogan et al. |
| 6,297,748 | B1 | 10/2001 | Lappenbusch et al. |
| 6,298,302 | B2 | 10/2001 | Walgers et al. |
| 6,308,120 | B1 | 10/2001 | Good |
| 6,317,685 | B1 | 11/2001 | Kozak et al. |
| 6,317,686 | B1 | 11/2001 | Ran |
| 6,321,158 | B1 | 11/2001 | DeLome et al. |
| 6,329,925 | B1 | 12/2001 | Skiver et al. |
| 6,330,499 | B1 | 12/2001 | Chou et al. |
| 6,339,736 | B1 | 1/2002 | Moskowitz et al. |
| 6,349,211 | B2 | 2/2002 | Koshima et al. |
| 6,349,261 | B1 | 2/2002 | Ohnishi et al. |
| 6,351,709 | B2 | 2/2002 | King et al. |
| 6,356,822 | B1 | 3/2002 | Diaz et al. |
| 6,362,730 | B2 | 3/2002 | Razavi et al. |
| 6,370,454 | B1 | 4/2002 | Moore |
| 6,373,883 | B1 | 4/2002 | Sorensen et al. |
| 6,374,177 | B1 | 4/2002 | Lee et al. |
| 6,381,533 | B1 | 4/2002 | Crane et al. |
| 6,389,337 | B1 | 5/2002 | Kolls |
| 6,397,067 | B1 | 5/2002 | Tanaka et al. |
| 6,408,307 | B1 | 6/2002 | Semple et al. |
| 6,421,593 | B1 | 7/2002 | Kempen et al. |
| 6,434,455 | B1 | 8/2002 | Snow et al. |
| 6,438,490 | B2 | 8/2002 | Ohta |
| 6,453,230 | B1 | 9/2002 | Geurts |
| 6,456,234 | B1 | 9/2002 | Johnson |
| 6,459,961 | B1 | 10/2002 | Obradovich et al. |
| 6,477,452 | B2 | 11/2002 | Good |
| 6,480,105 | B2 | 11/2002 | Edwards |
| 6,480,145 | B1 | 11/2002 | Hasegawa |
| 6,480,783 | B1 | 11/2002 | Myr |
| 6,510,317 | B1 | 1/2003 | Marko et al. |
| 6,522,250 | B1 | 2/2003 | Ernst et al. |
| 6,526,335 | B1 | 2/2003 | Treyz et al. |
| 6,529,143 | B2 | 3/2003 | Mikkola et al. |
| 6,539,269 | B1 | 3/2003 | Jarrow et al. |
| 6,539,302 | B1 | 3/2003 | Bender et al. |
| 6,542,794 | B2 | 4/2003 | Obradovich et al. |
| 6,542,822 | B1 | 4/2003 | Froeberg |
| 6,546,333 | B2 | 4/2003 | Tanaka et al. |
| 6,549,833 | B2 | 4/2003 | Katagishi et al. |
| 6,552,682 | B1 | 4/2003 | Fan |
| 6,553,289 | B2 | 4/2003 | Maki et al. |
| 6,553,290 | B1 | 4/2003 | Pillar |
| 6,553,308 | B1 | 4/2003 | Uhlmann et al. |
| 6,553,309 | B2 | 4/2003 | Uchida et al. |
| 6,553,313 | B1 | 4/2003 | Froeberg |
| 6,577,934 | B2 | 6/2003 | Matsunaga et al. |
| 6,583,734 | B2 | 6/2003 | Bates et al. |
| 6,584,401 | B2 | 6/2003 | Kirshenbaum et al. |
| 6,587,759 | B2 | 7/2003 | Obradovich et al. |
| 6,587,777 | B1 | 7/2003 | St. Pierre |
| 6,587,785 | B2 | 7/2003 | Jijina et al. |
| 6,587,787 | B1 | 7/2003 | Yokota |
| 6,590,507 | B2 | 7/2003 | Burns |
| 6,591,188 | B1 | 7/2003 | Ohler |
| 6,594,576 | B2 | 7/2003 | Fan et al. |
| 6,597,904 | B1 | 7/2003 | Neustein |
| 6,603,405 | B2 | 8/2003 | Smith |
| 6,604,038 | B1 | 8/2003 | Lesesky et al. |
| 6,608,559 | B1 | 8/2003 | Lemelson et al. |
| 6,609,004 | B1 | 8/2003 | Morse et al. |
| 6,611,740 | B2 | 8/2003 | Lowrey et al. |
| 6,611,753 | B1 | 8/2003 | Millington |
| 6,615,130 | B2 | 9/2003 | Myr |
| 6,615,133 | B2 | 9/2003 | Boies et al. |
| 6,615,186 | B1 | 9/2003 | Kolls |
| 6,618,669 | B2 | 9/2003 | Ota et al. |
| 6,622,083 | B1 | 9/2003 | Knockeart et al. |
| 6,622,087 | B2 | 9/2003 | Anderson |
| 6,633,238 | B2 | 10/2003 | Lemelson et al. |
| 6,636,721 | B2 | 10/2003 | Threadgill et al. |
| 6,647,417 | B1 | 11/2003 | Hunter et al. |
| 6,650,948 | B1 | 11/2003 | Atkinson et al. |
| 6,654,600 | B1 | 11/2003 | Pollak et al. |
| 6,657,558 | B2 | 12/2003 | Horita et al. |
| 6,658,485 | B1 | 12/2003 | Baber et al. |
| 6,662,090 | B2 | 12/2003 | Toyama et al. |
| 6,662,091 | B2 | 12/2003 | Wilson et al. |
| 6,664,922 | B1 | 12/2003 | Fan |
| 6,668,219 | B2 | 12/2003 | Hwang et al. |
| 6,677,854 | B2 | 1/2004 | Dix |
| 6,680,674 | B1 | 1/2004 | Park |
| 6,680,694 | B1 | 1/2004 | Knockeart et al. |
| 6,681,120 | B1 | 1/2004 | Kim |
| 6,691,025 | B2 | 2/2004 | Reimer |
| 6,697,633 | B1 | 2/2004 | Dogan et al. |
| 6,701,231 | B1 | 3/2004 | Borugian |
| 6,701,232 | B2 | 3/2004 | Yamaki |
| 6,707,421 | B1 | 3/2004 | Drury et al. |

| | | | |
|---|---|---|---|
| 6,711,398 | B1 | 3/2004 | Talaie et al. |
| 6,714,797 | B1 | 3/2004 | Rautila |
| 6,720,920 | B2 | 4/2004 | Breed et al. |
| 6,721,685 | B2 | 4/2004 | Kodama |
| 6,724,827 | B1 | 4/2004 | Patsiokas et al. |
| 6,730,940 | B1 | 5/2004 | Steranka et al. |
| 6,732,031 | B1 | 5/2004 | Lightner et al. |
| 6,735,416 | B1 | 5/2004 | Marko et al. |
| 6,735,504 | B2 | 5/2004 | Katagishi et al. |
| 6,738,697 | B2 | 5/2004 | Breed |
| 6,741,188 | B1 | 5/2004 | Miller et al. |
| 6,741,834 | B1 | 5/2004 | Godwin |
| 6,748,317 | B2 | 6/2004 | Maruyama et al. |
| 6,754,485 | B1 | 6/2004 | Obradovich et al. |
| 6,754,570 | B2 | 6/2004 | Iihoshi et al. |
| 6,757,712 | B1 | 6/2004 | Bastian et al. |
| 6,760,661 | B2 | 7/2004 | Klein et al. |
| 6,785,551 | B1 | 8/2004 | Richard |
| 6,785,606 | B2 | 8/2004 | DeKock et al. |
| 6,798,358 | B2 | 9/2004 | Joyce et al. |
| 6,804,589 | B2 | 10/2004 | Foxford et al. |
| 6,810,323 | B1 | 10/2004 | Bullock et al. |
| 6,810,328 | B2 | 10/2004 | Yokota et al. |
| 6,812,860 | B1 | 11/2004 | Schwarzwalder, Jr. |
| 6,812,888 | B2 | 11/2004 | Drury et al. |
| 6,813,549 | B2 | 11/2004 | Good |
| 6,816,778 | B2 | 11/2004 | Diaz |
| 6,819,268 | B2 | 11/2004 | Wakamatsu et al. |
| 6,819,986 | B2 | 11/2004 | Hong et al. |
| 6,823,169 | B2 | 11/2004 | Marko et al. |
| 6,823,263 | B1 | 11/2004 | Kelly et al. |
| 6,836,539 | B2 | 12/2004 | Katou et al. |
| 6,836,667 | B1 | 12/2004 | Smith, Jr. |
| 6,847,871 | B2 | 1/2005 | Malik et al. |
| 6,847,872 | B2 | 1/2005 | Bodin et al. |
| 6,847,889 | B2 | 1/2005 | Park et al. |
| 6,850,823 | B2 | 2/2005 | Eun et al. |
| 6,850,842 | B2 | 2/2005 | Park |
| 6,859,720 | B2 | 2/2005 | Satoh et al. |
| 6,859,726 | B2 | 2/2005 | Choi |
| 6,859,728 | B2 | 2/2005 | Sakamoto et al. |
| 6,862,524 | B1 | 3/2005 | Nagda et al. |
| 6,868,331 | B2 | 3/2005 | Hanebrink |
| 6,870,487 | B2 | 3/2005 | Nuesser et al. |
| 6,871,067 | B2 | 3/2005 | Clark et al. |
| 6,901,374 | B1 | 5/2005 | Himes |
| 6,911,918 | B2 | 6/2005 | Chen |
| 6,920,328 | B2 | 7/2005 | Wollrab |
| 6,920,382 | B2 | 7/2005 | Katagishi et al. |
| 6,928,423 | B1 | 8/2005 | Yamanaka |
| 6,944,430 | B2 | 9/2005 | Berstis |
| 6,961,758 | B2 | 11/2005 | Krishnan |
| 6,971,070 | B2 | 11/2005 | Obradovich et al. |
| 6,973,384 | B2 | 12/2005 | Zhao et al. |
| 6,978,206 | B1 | 12/2005 | Pu et al. |
| 6,983,200 | B2 | 1/2006 | Bodin et al. |
| 6,987,964 | B2 | 1/2006 | Obradovich et al. |
| 6,988,034 | B1 | 1/2006 | Marlatt et al. |
| 6,995,686 | B2 | 2/2006 | Gosdin et al. |
| 7,006,903 | B2 | 2/2006 | Smith et al. |
| 7,010,297 | B2 | 3/2006 | Yokota |
| 7,026,958 | B2 | 4/2006 | Wainfan et al. |
| 7,050,818 | B2 | 5/2006 | Tendler |
| 7,054,740 | B2 | 5/2006 | Chinomi et al. |
| 7,096,115 | B1 | 8/2006 | Groth et al. |
| 7,155,376 | B2 | 12/2006 | Yang et al. |
| 7,170,390 | B2 | 1/2007 | Quinones et al. |
| 7,174,301 | B2 | 2/2007 | Florance et al. |
| 7,184,866 | B2 | 2/2007 | Squires et al. |
| 7,210,142 | B2 | 4/2007 | Hilt et al. |
| 7,216,109 | B1 | 5/2007 | Donner |
| 7,307,513 | B2 | 12/2007 | Shutter et al. |
| 2001/0001848 | A1 | 5/2001 | Oshizawa et al. |
| 2001/0012004 | A1* | 8/2001 | Nunokawa et al. .......... 345/211 |
| 2001/0029425 | A1 | 10/2001 | Myr |
| 2002/0002534 | A1 | 1/2002 | Davis et al. |
| 2002/0003495 | A1 | 1/2002 | Johnstone et al. |
| 2002/0016655 | A1 | 2/2002 | Joao |
| 2002/0029339 | A1 | 3/2002 | Rowe |
| 2002/0032507 | A1 | 3/2002 | Diaz et al. |
| 2002/0044049 | A1 | 4/2002 | Saito et al. |
| 2002/0049531 | A1 | 4/2002 | Tanaka et al. |
| 2002/0062236 | A1 | 5/2002 | Murashita |
| 2002/0067289 | A1 | 6/2002 | Smith |
| 2002/0072378 | A1 | 6/2002 | Gaal |
| 2002/0077741 | A1 | 6/2002 | Hanebrink |
| 2002/0080022 | A1 | 6/2002 | Edwards |
| 2002/0087237 | A1 | 7/2002 | Ol et al. |
| 2002/0103582 | A1 | 8/2002 | Ohmura et al. |
| 2002/0103583 | A1 | 8/2002 | Ohmura et al. |
| 2002/0103597 | A1 | 8/2002 | Takayama et al. |
| 2002/0128773 | A1 | 9/2002 | Chowanic et al. |
| 2002/0152021 | A1 | 10/2002 | Ota et al. |
| 2002/0152115 | A1 | 10/2002 | Morita et al. |
| 2002/0156692 | A1 | 10/2002 | Squeglia et al. |
| 2002/0161495 | A1 | 10/2002 | Yamaki |
| 2002/0161841 | A1 | 10/2002 | Kinnunen |
| 2002/0165662 | A1 | 11/2002 | Maruyama et al. |
| 2002/0165665 | A1 | 11/2002 | Kim |
| 2002/0176494 | A1 | 11/2002 | Zhao et al. |
| 2002/0177926 | A1 | 11/2002 | Lockwood et al. |
| 2002/0193923 | A1 | 12/2002 | Toyama et al. |
| 2002/0193926 | A1 | 12/2002 | Katagishi et al. |
| 2002/0198632 | A1 | 12/2002 | Breed et al. |
| 2002/0198637 | A1 | 12/2002 | Shibata |
| 2003/0006912 | A1 | 1/2003 | Brescia |
| 2003/0028297 | A1 | 2/2003 | Iihoshi et al. |
| 2003/0028312 | A1 | 2/2003 | Matsuoka et al. |
| 2003/0051239 | A1 | 3/2003 | Hudspeth |
| 2003/0060977 | A1 | 3/2003 | Jihina |
| 2003/0063628 | A1 | 4/2003 | Marko et al. |
| 2003/0069683 | A1 | 4/2003 | Lapidot et al. |
| 2003/0069978 | A1 | 4/2003 | Cherry et al. |
| 2003/0081587 | A1 | 5/2003 | Ichiyoshi |
| 2003/0083813 | A1 | 5/2003 | Park |
| 2003/0093476 | A1 | 5/2003 | Syed |
| 2003/0095038 | A1 | 5/2003 | Dix |
| 2003/0098782 | A1 | 5/2003 | Eastman et al. |
| 2003/0109972 | A1 | 6/2003 | Tak |
| 2003/0117982 | A1 | 6/2003 | Minnick |
| 2003/0125866 | A1 | 7/2003 | Mori et al. |
| 2003/0158640 | A1 | 8/2003 | Pillar et al. |
| 2003/0167110 | A1 | 9/2003 | Smith et al. |
| 2003/0169182 | A1 | 9/2003 | Wilhelm et al. |
| 2003/0182034 | A1 | 9/2003 | Katagishi et al. |
| 2003/0191583 | A1 | 10/2003 | Uhlmann et al. |
| 2003/0195695 | A1 | 10/2003 | Maruyama et al. |
| 2003/0195814 | A1 | 10/2003 | Striemer |
| 2003/0216859 | A1 | 11/2003 | Martell et al. |
| 2003/0225516 | A1 | 12/2003 | DeKock et al. |
| 2003/0229441 | A1 | 12/2003 | Pechatnikov et al. |
| 2003/0236613 | A1 | 12/2003 | Satoh et al. |
| 2004/0010366 | A1 | 1/2004 | Videtich |
| 2004/0012501 | A1 | 1/2004 | Mazzara et al. |
| 2004/0024753 | A1 | 2/2004 | Chane et al. |
| 2004/0043760 | A1 | 3/2004 | Rosenfeld et al. |
| 2004/0044605 | A1 | 3/2004 | Bodin et al. |
| 2004/0059613 | A1 | 3/2004 | Ford et al. |
| 2004/0059781 | A1 | 3/2004 | Yoakum et al. |
| 2004/0068362 | A1 | 4/2004 | Maekawa et al. |
| 2004/0068363 | A1 | 4/2004 | Goto |
| 2004/0068364 | A1 | 4/2004 | Zhao et al. |
| 2004/0073356 | A1 | 4/2004 | Craine |
| 2004/0075774 | A1 | 4/2004 | Chang et al. |
| 2004/0080430 | A1 | 4/2004 | Videtich |
| 2004/0085198 | A1 | 5/2004 | Saito et al. |

| | | | |
|---|---|---|---|
| 2004/0093243 | A1 | 5/2004 | Bodin et al. |
| 2004/0102898 | A1 | 5/2004 | Yokota et al. |
| 2004/0104842 | A1 | 6/2004 | Drury et al. |
| 2004/0110515 | A1 | 6/2004 | Blumberg et al. |
| 2004/0117113 | A1 | 6/2004 | Friedrichs et al. |
| 2004/0119612 | A1 | 6/2004 | Chen |
| 2004/0148099 | A1 | 7/2004 | Kim |
| 2004/0150534 | A1 | 8/2004 | Linn |
| 2004/0158392 | A1 | 8/2004 | Choi |
| 2004/0167707 | A1 | 8/2004 | Bragansa et al. |
| 2004/0172192 | A1 | 9/2004 | Knutson |
| 2004/0198217 | A1 | 10/2004 | Lee et al. |
| 2004/0203630 | A1 | 10/2004 | Wang |
| 2004/0203909 | A1 | 10/2004 | Koster |
| 2004/0204821 | A1 | 10/2004 | Tu |
| 2004/0204842 | A1 | 10/2004 | Shinozaki |
| 2004/0208204 | A1 | 10/2004 | Crinon |
| 2004/0233070 | A1 | 11/2004 | Finnern |
| 2004/0233101 | A1 | 11/2004 | Kim |
| 2004/0239526 | A1 | 12/2004 | Nakajima |
| 2004/0239531 | A1 | 12/2004 | Adamczyk |
| 2004/0246147 | A1 | 12/2004 | von Grabe |
| 2004/0249529 | A1 | 12/2004 | Kelly et al. |
| 2004/0249530 | A1 | 12/2004 | Kelly et al. |
| 2004/0249531 | A1 | 12/2004 | Kelly et al. |
| 2004/0249532 | A1 | 12/2004 | Kelly et al. |
| 2004/0252197 | A1 | 12/2004 | Fraley et al. |
| 2004/0260786 | A1 | 12/2004 | Barile |
| 2005/0001743 | A1 | 1/2005 | Haemerle |
| 2005/0015186 | A1 | 1/2005 | Kelly et al. |
| 2005/0015197 | A1 | 1/2005 | Ohtsuji et al. |
| 2005/0015199 | A1 | 1/2005 | Lokshin et al. |
| 2005/0021197 | A1 | 1/2005 | Zimmerman et al. |
| 2005/0021199 | A1 | 1/2005 | Zimmerman et al. |
| 2005/0024236 | A1 | 2/2005 | Gosdin et al. |
| 2005/0027436 | A1 | 2/2005 | Yoshikawa et al. |
| 2005/0027442 | A1 | 2/2005 | Kelley et al. |
| 2005/0027447 | A1 | 2/2005 | Hirose et al. |
| 2005/0027449 | A1 | 2/2005 | Marsh |
| 2005/0033511 | A1 | 2/2005 | Pechatnikov et al. |
| 2005/0038581 | A1 | 2/2005 | Kapolka et al. |
| 2005/0038596 | A1 | 2/2005 | Yang et al. |
| 2005/0043880 | A1 | 2/2005 | Yamane et al. |
| 2005/0046594 | A1 | 3/2005 | Taylor |
| 2005/0060070 | A1 | 3/2005 | Kapolka et al. |
| 2005/0065678 | A1 | 3/2005 | Smith et al. |
| 2005/0065717 | A1 | 3/2005 | Meuller et al. |
| 2005/0068174 | A1 | 3/2005 | Oesterling et al. |
| 2005/0075095 | A1 | 4/2005 | Dillon |
| 2005/0080519 | A1 | 4/2005 | Oesterling et al. |
| 2005/0090951 | A1 | 4/2005 | Good |
| 2005/0093720 | A1 | 5/2005 | Yamane et al. |
| 2005/0096811 | A1 | 5/2005 | Bodin et al. |
| 2005/0096840 | A1 | 5/2005 | Simske |
| 2005/0125117 | A1 | 6/2005 | Breed |
| 2005/0131626 | A1 | 6/2005 | Ignatin |
| 2005/0131628 | A1 | 6/2005 | Peeters |
| 2005/0137763 | A1 | 6/2005 | Watkins et al. |
| 2005/0137790 | A1* | 6/2005 | Yamada et al. .............. 701/202 |
| 2005/0143882 | A1 | 6/2005 | Umezawa |
| 2005/0221876 | A1 | 10/2005 | Van Bosch et al. |
| 2005/0222760 | A1* | 10/2005 | Cabral et al. ................ 701/209 |
| 2005/0273218 | A1 | 12/2005 | Breed et al. |
| 2005/0288856 | A1 | 12/2005 | Uyeki et al. |
| 2006/0022846 | A1 | 2/2006 | Tummala |
| 2006/0055565 | A1 | 3/2006 | Kawamata et al. |
| 2006/0058037 | A1 | 3/2006 | Kenyon |
| 2006/0058950 | A1 | 3/2006 | Kato et al. |
| 2006/0161347 | A1 | 7/2006 | Charlot et al. |
| 2006/0178807 | A1 | 8/2006 | Kato et al. |
| 2006/0200302 | A1 | 9/2006 | Seko |
| 2006/0217849 | A1 | 9/2006 | Obradovich et al. |
| 2008/0088480 | A1* | 4/2008 | Rozum et al. ............... 340/933 |
| 2008/0106436 | A1 | 5/2008 | Breed |

FOREIGN PATENT DOCUMENTS

| | | |
|---|---|---|
| EP | 0973299 | 1/2000 |
| EP | 1276088 | 1/2003 |
| JP | 6276056 | 9/1994 |
| JP | 8149029 | 6/1996 |
| JP | 10-150477 | 6/1998 |
| JP | 2000201104 | 7/2000 |
| JP | 2000293788 | 10/2000 |
| JP | 2001168743 | 6/2001 |
| JP | 2001-216555 | 8/2001 |
| JP | 2002-032276 | 1/2002 |
| JP | 2002-077295 | 3/2002 |
| JP | 2002-084298 | 3/2002 |
| JP | 2002-318844 | 10/2002 |
| JP | 2003042797 | 2/2003 |
| WO | WO 97/01940 | 1/1997 |

OTHER PUBLICATIONS

"Sirius Satellite Radio—Help" Help, dated Oct. 6, 2002 by archive.org; 8 pages.

"The Application of a Novel Two-Way Mobile Satellite Communications and Vehicle Tracking System to the Transportation Industry" Jacobs et al., Feb. 1991, IEEE Transactions on Vehicular Technology, vol. 40, No. 1, pp. 57-63.

* cited by examiner

Facility ID Database

| F-ID# (402) | Name (502) | Address (504) | Phone # (506) | Location (508) |
|---|---|---|---|---|
| 1 | ABC Theater | 1XX Harpers Way, Any Town, CA | 310-XXX-XXXX | Longitude XXXX<br>Latitude XXXX |
| 2 | PCH Theater | 3XX PCH, Any Town, CA | 310-XXX-XXXX | Longitude XXXX<br>Latitude XXXX |
| 3 | | | | |

FIG. 4a

Event ID Database

| E-ID# (404) | Movie Title (510) | Descriptions (512) | Actors (514) |
|---|---|---|---|
| 1 | People in a Town | An Incident in a Peaceful Town Drives People Crazy..... | Paul XXX, Ann EEE, David DD |
| 2 | Perfect Action II | The Best Action Movie of the Year... | Sam SSS, Albert AAA, Lori LLL |
| 3 | A Day in the Life | There was a Man who was.... | Eric EE, Scott SSS |
| | | | |
| 256 | | | |

FIG. 4b

Show Time Data by Facility

| F-ID# (402) | E-ID (404) | Event Program Data (406) | Expire Date (408) |
|---|---|---|---|
| 4321 | 28 | 1045, 1300, 1415, 1630, 1845, 2100 | 030905 |

Show Time Data by Facility (Multi-Screen Theater)

| F-ID# (402) | E-ID (404) | Event Program Data (406) | Expire Date (408) |
|---|---|---|---|
| 4321 | 28 | 1045, 1300, 1415, 1630, 1845, 2100 | 030905 |
| | 30 | 1000, 1300, 1600, 1900, 2100 | 030905 |

Conventional Method

SYSTEM AND METHOD FOR SELECTIVELY FILTERING AND PROVIDING EVENT PROGRAM INFORMATION

BACKGROUND OF THE INVENTION

1. Field of the Invention

The present invention relates to a method and system for communicating information to vehicles from a remote location, and more particularly, to a method and system for filtering and buffering user searchable event program information and broadcasting the event program information to the vehicles.

2. Description of Related Art

Navigation systems for determining a route from a starting point to a destination point are well known in the art. In addition, navigation systems having capabilities for determining the geographic position of a reference point are also well known in the art, such as a Global Positioning System ("GPS") or a self-contained system having distance and bearing sensors. As an example, a commonly used navigation system allows a user (or driver) of a vehicle to enter a destination into the navigation system. The navigation system then looks up an appropriate route from an original point (using its geographic positioning capabilities) to the destination point in a road map database (e.g., the route may be a route having the shortest distance from the start point to the destination point, one which would take the vehicle the least time, or some other route), and guides the user to the destination along the searched route through a visual display or vocal guide.

Recently, navigation systems have been improved to provide and utilize vehicle-related or geographically-relevant, real time traffic information in guiding the user to her destination, described in further detail in U.S. patent application Ser. No. 11/093,919, filed Mar. 29, 2005, titled Display Method and System for a Vehicle Navigation System, the disclosure of which is incorporated in its entirety herein by reference. There also currently existing systems and methods of providing other types of location-based event program information to vehicle users. More specifically, event program information can comprise such time sensitive event program information as movies, sports events, plays, operas, concerts, etc. Location-based event program information is event program information that is scheduled to take place at venues within a predefined distance from a vehicle's current location or within a geographic zone (such as a postal zip code). The drawback of such existing systems and methods is that the vehicle navigation system does not maintain the needed data in system memory, on a hard disk drive, or a DVD disc. Thus when a user desires to view such information, it must first be received by the system via a broadcast or cellular network. The downloading of such a large volume of data requires a significant amount of data bandwidth, as well as long wait times for the user before the desired information can be displayed.

Thus, there remains a need for systems and methods for collecting, utilizing, and providing vehicle location-based event program information that is frequently updated and searchable by the user, wherein a vehicle navigation system receives, processes, and buffers event program information in memory while the navigation system is initializing, so that location-based event program information is quickly available to display to the user. A system that automatically updates itself daily in the background would reduce the bandwidth of broadcast data required to provide the user with selectable filtered event program information on her vehicle's navigation system when the user utilizes the system. Such a system would reduce the time needed for the vehicle navigation system to filter and process the event program data, as well as reducing the demands on the broadcasting network, so that less costly and sophisticated broadcast network systems are required to transmit location-based event program data to vehicle navigation systems. Additionally, it would be desirable to provide a vehicle navigation system that receives and processes real time information (e.g., traffic, weather, and other geographically-relevant or vehicle-related information) in guiding the user to an event program she has viewed and selected from her vehicle's navigation system.

Moreover, there remains a need for a method and system for providing location-based event program information that is available for display to the user soon after the navigation system is initialized, thereby minimizing the delays needed for the system to retrieve and filter the data based on the vehicle's current location. Moreover, it is desired that the navigation system be provided with enough information to properly determine efficient routes to venues the user selects from the event program information displayed without being inundated with low priority, redundant, or superfluous traffic information. Thus, there is a need for providing event program information to a user in a useful, efficient manner that is easy to select by location with minimal wait time.

Accordingly, it would be desirable to provide a vehicle navigation method and system that overcomes the above-described shortcoming of the prior art while retaining their advantages.

SUMMARY OF THE INVENTION

The present invention addresses the shortcomings of the prior art systems and methods. In particular, the present invention is directed to a system and method for providing location-based event program information to a user in a useful, efficient manner that is easy to select by user selected criteria, such as venue, with minimal wait time required.

In accordance with one aspect of the embodiments described herein, there is provided a system for communicating event program information to at least one vehicle from a remote location that is filtered by a vehicle's current location. The system can comprise one or more antennas, a broadcast receiver unit having a data filter, and a navigational device and that displays to a user event program information by venue within a set distance from the vehicle's current location, with multi-leveled sub-menus that provide the user with a variety of event program information. In one embodiment, event program information comprises movie related information such as screening times, cast listings, movie reviews, movie trailers, etc The event program information can be broadcast by a plurality of methods such as satellite radio, digital FM radio broadcast, or a cellular telephone network. The system further comprises a memory buffer unit in the receiver unit that stores the vehicle's last reported location data and cross-referenced databases of movie program information with periodic updates so as to minimize bandwidth requirements of the system. The receiver unit can process and filter event program data while the navigational unit is initializing, using data stored in the memory buffer. The results can be stored in the memory buffer until the navigational unit is ready to receive, process, and display the data, thereby significantly reducing the wait time for the navigational unit to display the event program information to the unit.

In order to overcome the physical limitations of available memory space for data storage, the system can use a First-in, First-Out ("FIFO") approach; wherein the oldest stored event program information is deleted first to make room for newer updates to the databases and the old database identifiers or fields are reassigned to new information received by the receiver unit.

In another embodiment of the invention, the user can filter the event program information by movie titles, wherein movie titles are displayed to the user by the navigational unit that are within a set distance from the vehicle's current location. The user can then determine which venues are screening the movies she is interested in attending. Once the user has mad a choice of venues to travel to, there is provided a method for generating maps and driving directions to guide the user to the event venue she desires. The method further comprises a voice synthesizer that emits a voice to guide the user along the travel route to the desired venue. In one approach, real time estimates of travel time to the event venue are provided to the user by the navigational unit.

In accordance with another aspect of the embodiments described herein, there is provided a method for providing event information to a user of a vehicle, comprising determining a geographic position of the vehicle, storing position data regarding the determined geographic position in a memory prior to a vehicle reactivation, retrieving the position data from the memory after the vehicle reactivation, and receiving event information from a remote location. The method further comprising filtering the received event information to discard information regarding events occurring farther than a predetermined distance from the determined geographic position of the vehicle. In a variation of this embodiment, this method further comprises generating the updated event information from the filtered event program updates, and displaying the updated event information to the user.

In accordance with yet another aspect of the embodiments described herein, there is provided a system for providing updated event information to a user of a vehicle, comprising a navigation unit for determining a geographic position of the vehicle, a receiver for receiving event program updates from a remote location, a memory unit, and a processor. The processor unit is operatively coupled to the navigation, receiver, and memory units, wherein the processor unit is programmed to store position data regarding the determined geographic position in the memory unit prior to a vehicle deactivation, and to retrieve the position data from the memory unit after the vehicle reactivation. The processor is further programmed to filter the received event program updates, to discard updates regarding events occurring farther than a predetermined distance from the determined geographic position of the vehicle, and to generate the updated event information from the filtered event program updates.

In accordance with yet another aspect of the embodiments described herein, there is provided a system for providing event information to a user of a vehicle, comprising a navigation unit for determining a geographic position of the vehicle, a receiver for receiving the event information, a memory unit, a processor unit operatively coupled to the navigation, receiver, and memory units. The processor unit stores position data regarding the determined geographic position in the memory unit prior to a vehicle deactivation, and retrieves the position data from the memory unit after the vehicle reactivation. The processor unit then filters the received event information to discard information regarding events occurring farther than a predetermined distance from the determined geographic position of the vehicle.

A more complete understanding of the a system and method for providing location-based event program information to a user will be afforded to those of skill in the art, as well as a realization of additional advantages and objectives thereof, by a consideration of the following detailed description of a preferred embodiment. Reference will be made to the appended sheets of drawings which will first be described briefly.

BRIEF DESCRIPTION OF THE DRAWINGS

FIG. 4*a* is a data table showing an example of entries in a Facility ID database for the venues that can be cross-referenced to other event program information;

FIG. 4*b* is a data table showing an example of entries in an Event ID database for event titles that can be cross-referenced to other event program information;

FIG. 12 is a flowchart of a method for displaying filtered event program information to a user of the vehicle navigation system after the vehicle ignition is turned on;

FIG. 13*b* is a flowchart of an improved method that displays filtered event program information to a user of the vehicle navigation system in an expedited manner, after the vehicle ignition is turned on;

DETAILED DESCRIPTION OF THE PREFERRED EMBODIMENT

The present invention generally relates to systems and methods for providing location-based event program information or event information or point of interest information to a vehicle navigation system. Event program information is regularly updated while the vehicle's ignition is turned to the "On" or "Accessory" position (i.e., while the vehicle is driven). The data received is preferably stored in a memory buffer for quick retrieval the next time the vehicle navigation system is initialized. In the detailed description that follows, like element numerals are used to describe like elements illustrated in one or more of the figures.

Figure 1A:
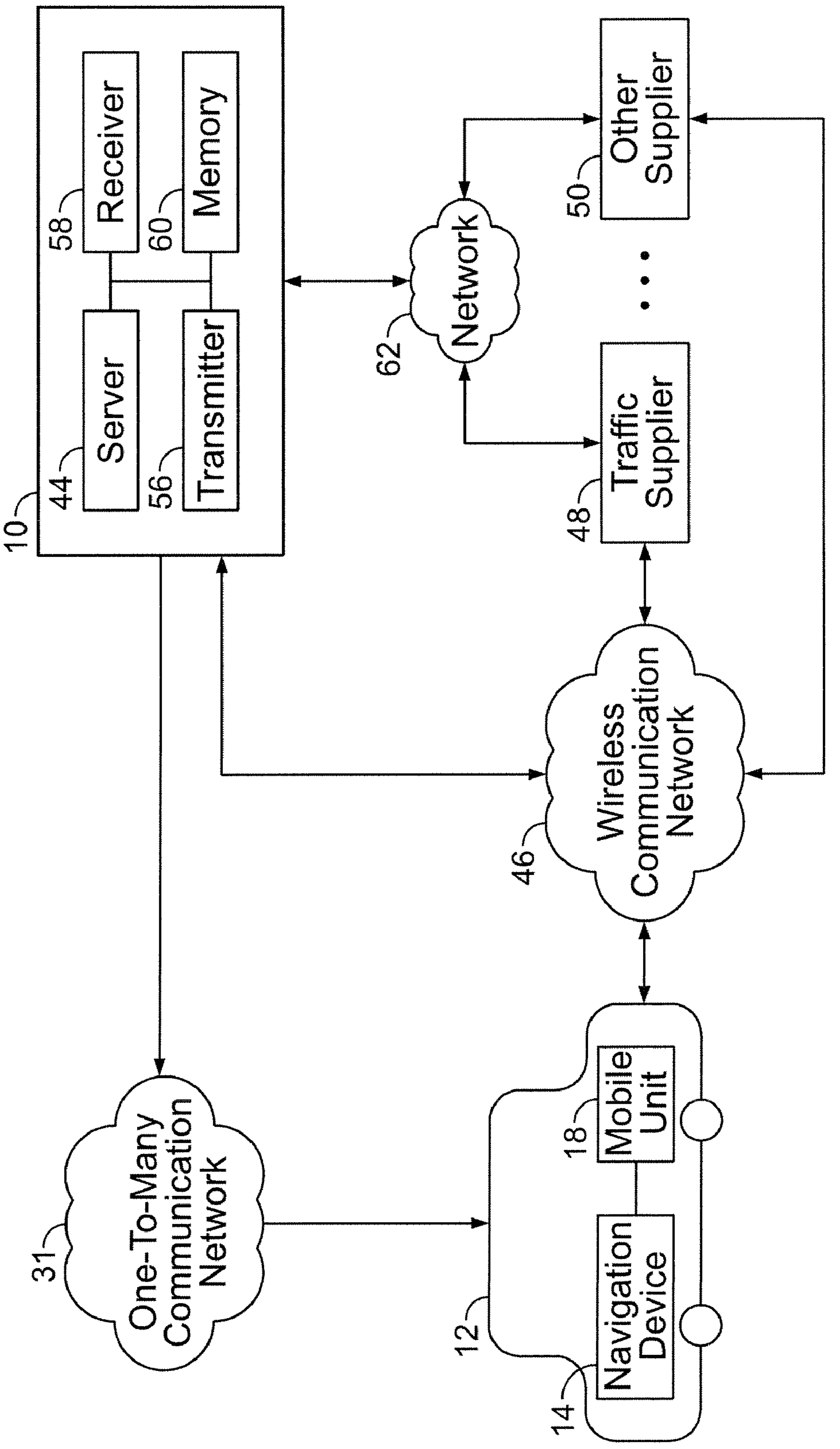
FIG. 1*a* is a schematic diagram of a first embodiment of a system pursuant to aspects of the invention.
Figure 1B:
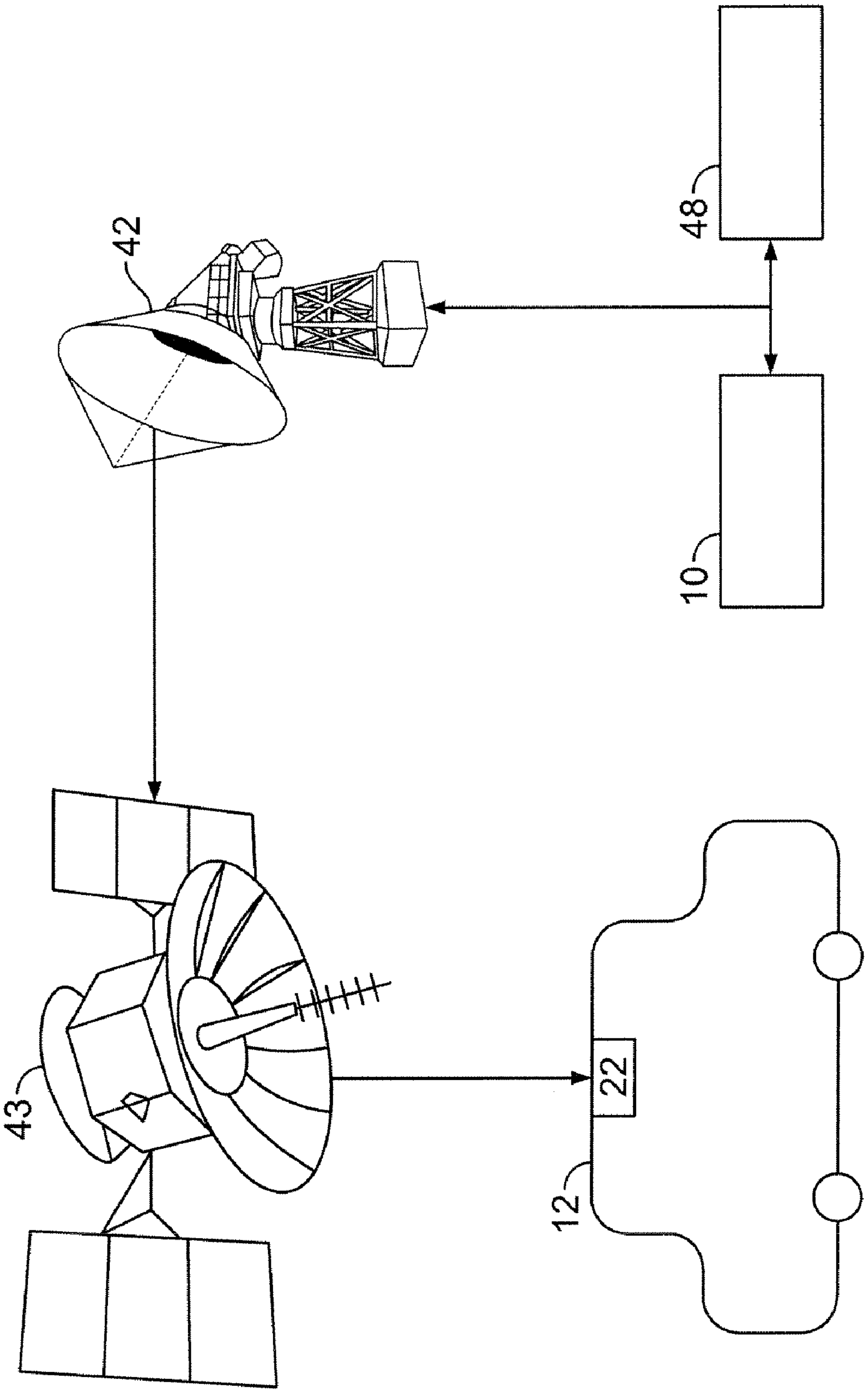
FIG. 1*b* is a schematic diagram of a broadcast communication network.
Figure 1C:
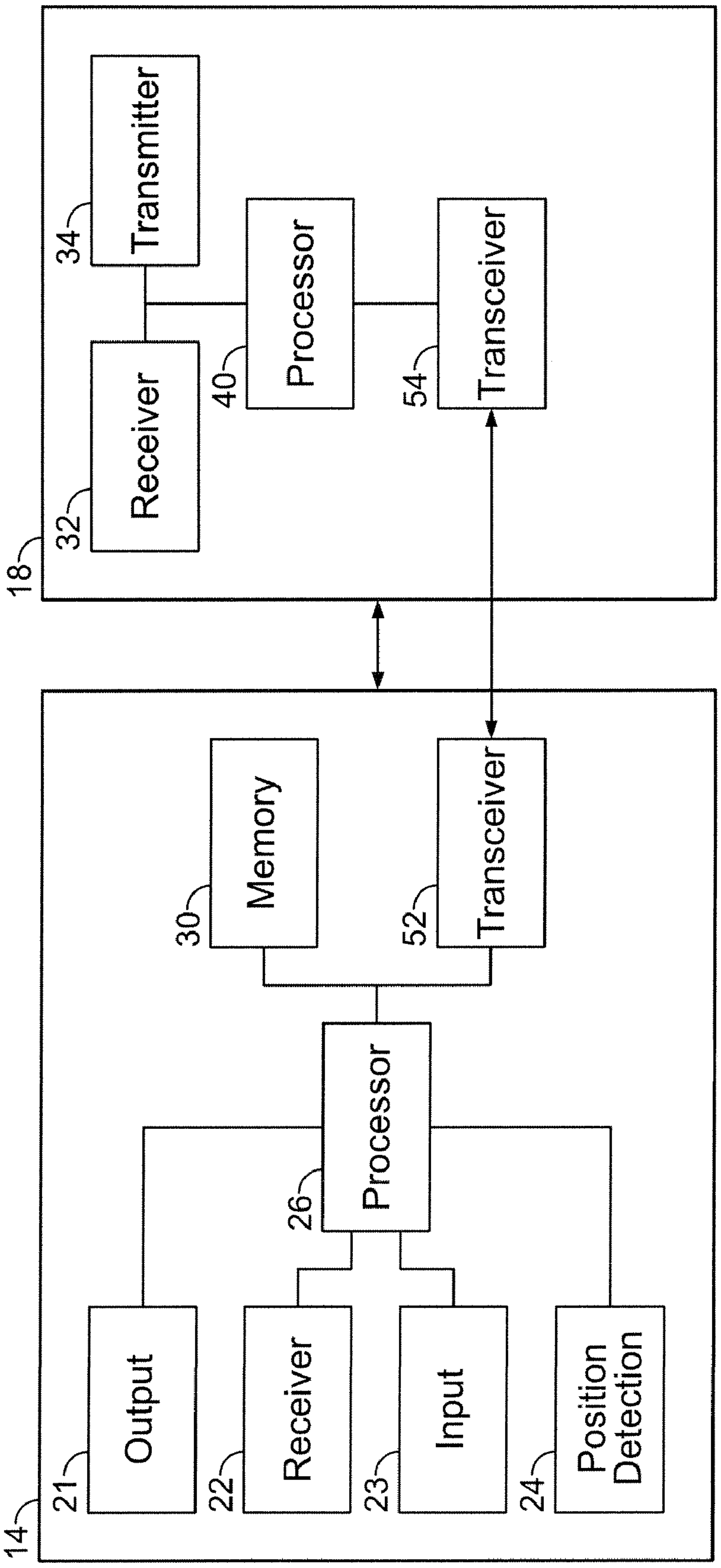
FIG. 1*c* is a schematic diagram of a navigation device in communication with a mobile unit.

With reference to FIG. 1*a*, a first embodiment of a system for facilitating the exchange of information between a remote location 10 and a vehicle 12 is illustrated pursuant to aspects of the invention. The vehicle 12 includes a navigation device 14. Referring now also to FIG. 1*c*, the navigation device 14 may include an output unit 21, a receiver unit 22, an input unit 23, a position detection unit 24, a navigation memory unit 30, a navigation processor unit 26, and an RF transceiver unit 52 that are all in electrical communication with one another. The navigation memory unit 30 includes at least a portion of a user profile and in some embodiments may include the entire user profile. In addition, the navigation memory unit 30 includes a road map database portion and, in some embodiments, includes a disk reading unit for reading road map information not built into the navigation device 14. As is provided in greater detail below, the user profile and/or the road map database stored in the memory 30 may be updated in the vehicle by way of the input unit 23, which can include at least one of a keyboard, a touch sensitive display, and a microphone. The user profile and/or the road map database may also be updated by way of information received through the receiver unit 22 and/or the RF transceiver unit 52.

The receiver unit 22 receives information from the remote location 10 and, in one embodiment, is in communication with the remote location by way of a one-to-many communication system. One-to-many communication systems include systems that can send information from one source to a plurality of receivers, such as a broadcast network 31. Broadcast networks include television, radio, and satellite networks. Referring now to FIG. 1*b*, in one embodiment, the broadcast network 31 comprises a radio satellite network that comprises broadcast towers 42, satellite servers (not shown), and satellites 43. The broadcast towers 42 transmit information to the satellites 43, which relay the information back down to the receiver unit 22 of the navigation device 14.

Referring now to FIG. 1*c*, the information received by the receiver 22 may be processed by the navigation processor unit 26. The processed information may then be displayed by way of the output unit 21, which includes at least one of a display and a speaker. In one embodiment, the receiver unit 22, the navigation processor unit 26 and the output unit 21 are provided access to only subsets of the received broadcast information based on user preferences and/or traffic information demands. The user preferences, as well as user identity information, traffic-related information and point of interest information, can be part of the user profile.

The position detection unit 24 may include a GPS receiver that communicates with a plurality of GPS satellites to determine the position of the vehicle 12 (shown in FIG. 1*a*). For example, the GPS receiver searches for and collects GPS information (or signals) broadcast from four or more GPS satellites that are in view of the GPS receiver. Next, using the time interval between the broadcast time and reception time of each broadcast signal, the GPS receiver calculates the distance between the GPS receiver and each of the four or more GPS satellites. These distance measurements, along with the position and time information received in the broadcast signals, allow the GPS receiver to calculate the geographic position of the vehicle 12.

Returning now to the embodiment shown in FIG. 1*a*, the mobile unit 18 is used to receive and transmit information from and to the remote location 10. The mobile unit 18 may be a wireless telephone or any other device that communicates with other devices by way of the wireless communication network 46. The details of the mobile unit 18 are shown in the embodiment of FIG. 1*c* wherein, the mobile unit 18 includes a wireless receiver 32, a wireless transmitter 34, a mobile unit processor 40, and an RF transceiver unit 54 that are in communication with one another. The mobile unit 18 is in two-way communication with the remote location 10 (shown in FIG. 1*a*) by way of the receiver 32, the transmitter 34, and the wireless communication network 46 (shown in FIG. 1*a*), which comprises numerous base stations. In one embodiment, information is transmitted from or to the vehicle or remote location over a high bandwidth GPRS/1XRTT channel of the wireless communication network 46. If the high bandwidth channel is unavailable, a low bandwidth DTMF channel can be used. The receiver 32 receives information from the remote location 10, and the transmitter 34 transmits information to the remote location 10. In other embodiments, the transmitter 34 also transmits information to suppliers of traffic 48 and/or other information 50.

In one embodiment, the information received from and transmitted to the remote location 10 by way of the mobile unit 18 is accessed by the user through the navigation device 14, which is in communication with the mobile unit 18. The mobile unit 18 may be embedded in the vehicle 12 and be in communication with the navigation device 14 by, for example, a cable (not shown).

In another embodiment, the navigation device 14 and mobile unit 18 are in communication with one another by way of RF transceiver units 54 and 52. Both the navigation device 14 and the mobile unit 18 include RF transceiver units 52, 54, which, in one embodiment, comply with the Bluetooth® wireless data communication standard and protocol established by Bluetooth SIG, Inc. or the like. The RF transceiver units 52, 54 allow the navigation device 14 and the mobile unit 18 to communicate with one another. In other embodiments (not shown), the receiver 32 and transmitter 14 of the mobile unit 18 and the receiver unit 20 of the navigation device 14 allow the navigation device 14 and mobile unit 18 to communicate with one another. In yet other embodiments, there may be an RF transceiver that is separate from the navigation device 14 and the mobile unit 18 and that allows the navigation device 14 and mobile unit 18 to communicate with one another.

Figure 2:
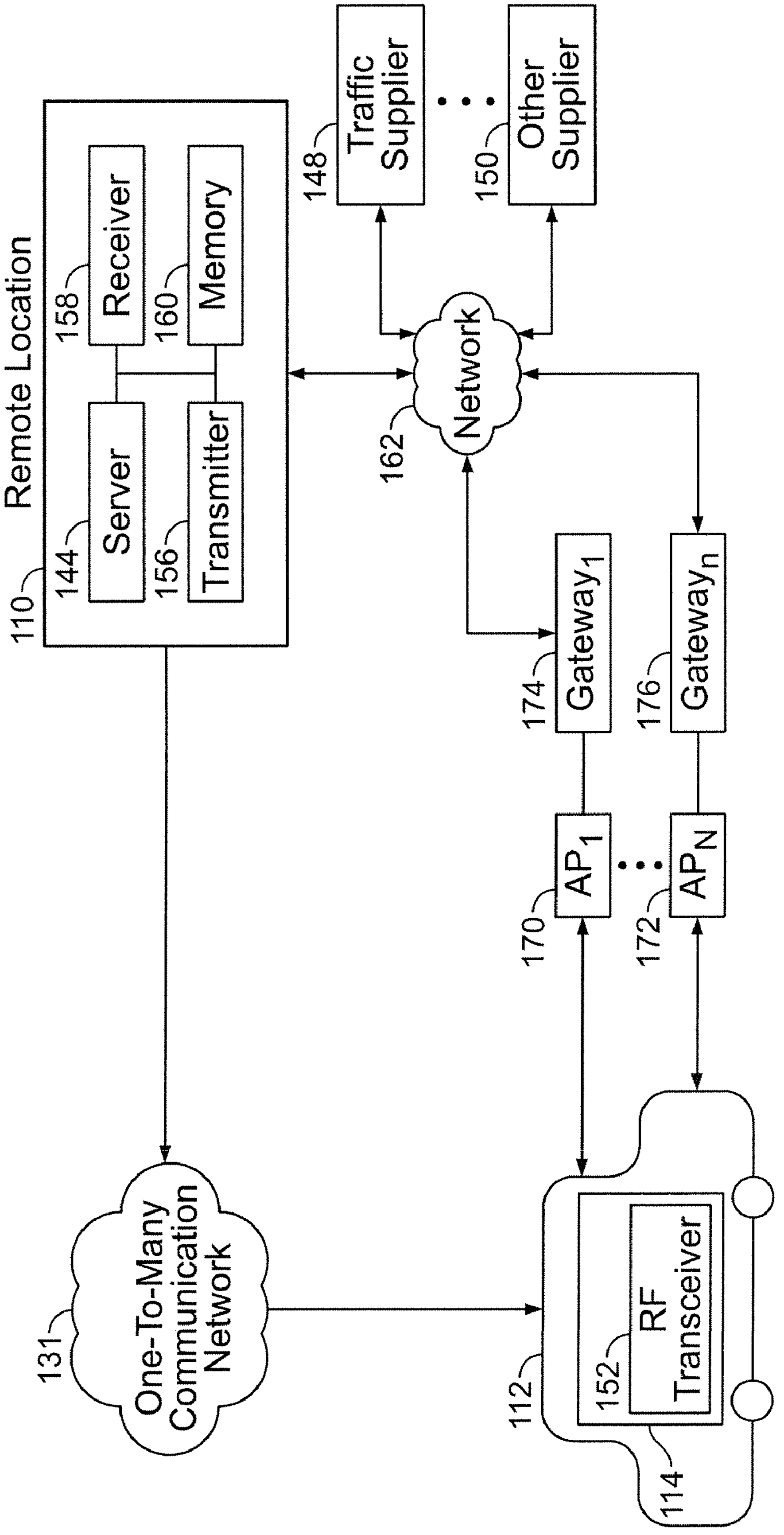
FIG. 2 is a schematic diagram of an alternate embodiment of a system.

In the alternate embodiment shown in FIG. 2, the navigation device 114 transmits and receives information to and from the remote location 110 by way of the RF transceiver 152, access points 170, 172, and gateways 174, 176 that are in communication with the network 162. In one embodiment, the RF transceiver 152 and the access points 170, 172 are compliant with the IEEE 802.11x specification, and such transceivers and access points include Wi-Fi®-certified equipment that complies with the standards set by the Wireless Ethernet Compatibility Alliance, Inc. The access points 170, 172 are typically in communication with the gateways 174, 176 by way of a cable, and the gateways are in communication with the remote location 110 by way of the network 162. The access points 170, 172 are in communication with the RF transceiver 152 and have a limited range over which they can communicate with the RF transceiver 152. Thus, it is preferable that there be numerous access points 170, 172 positioned so that the distance between the access points and the areas through which a vehicle 12 might pass is less than or equal to the limited range of the access points. When the access points 170, 172 are so positioned, the RF transceiver 152 effectively exchanges information with the access points 170, 172 and, thus, the remote location 110.

Note that in the alternate embodiment of FIG. 2, the navigation device 114 also includes input and output units, a receiver unit, a memory unit, and a processor unit, none of which are shown. The components of the alternate navigation device embodiment 114 have the same functionality as do the corresponding components of the navigation device 14 of the first embodiment.

The remote locations 10, 110 include remote servers 44, 144, remote transmitters 56, 156, receivers 58, 158, and remote memory 60, 160, that are in communication with one another. As provided above, in the first embodiment, the remote transmitter 56 and receiver 58 communicate with the navigation device 14 and mobile unit 18 by way of the broadcast 31 and wireless 46 communication networks, respectively. In the alternate embodiment, the remote transmitter 156 and receiver 158 communicate with the navigation device 114, including the RF transceiver 152, by way of the broadcast communication network 131 and a network 162. The remote locations 10, 110 are also in communication with suppliers of traffic 48, 148 and/or other information 50, 150, such as government traffic information suppliers, private traffic information suppliers, and users of other vehicles, by way of the networks 62, 162.

In both the first and alternate embodiments shown in FIGS. 1*a* and 2, the network 62, 162 is typically a wide area network (WAN) such as the Internet. In other embodiments, some of the information suppliers 48, 50, 148, 150, such as the government and private traffic information suppliers, may be in communication with the remote location 10, 110 by way of a local area network (LAN), while other information providers 48, 50, 148, 150 such as the vehicle users, are in communication with the remote location by way of the Internet. In yet other embodiments, the RF transceiver 152 is in communication with the remote location 110 and/or the information providers 148, 150 by way of a network 162 that is a LAN. In these other embodiments, the LAN 162 is compliant with the IEEE 802.3 specification or is an Ethernet network.

As provided in greater detail below, the information suppliers 48, 50, 148, 150 may transmit updated user profiles and traffic-related information as well as point of interest information to the remote locations 10, 110. A plurality of user profiles are in a user profile database, which, along with traffic-related information, are stored in the remote memory 60, 160. The updated user profiles and new traffic-related information are transmitted from the remote locations 10, 110 to the navigation devices 14, 114 by way of the broadcast networks 31, 131. In other embodiments, the new traffic-related information, point of interest information, and updated user profiles may be transmitted to the vehicles 12, 112 by way of the wireless network 46 or the network 162. At the vehicle, the user profile stored in the memory 30 of the navigation device 14 is updated, and the vehicle-related information is made accessible to the user by way of the output unit 21 of the navigation device 14. In other embodiments, the information providers may communicate directly with the mobile unit 18 or RF transceiver 152 by way of the wireless communication network 46 or the network 162.

Figure 3:
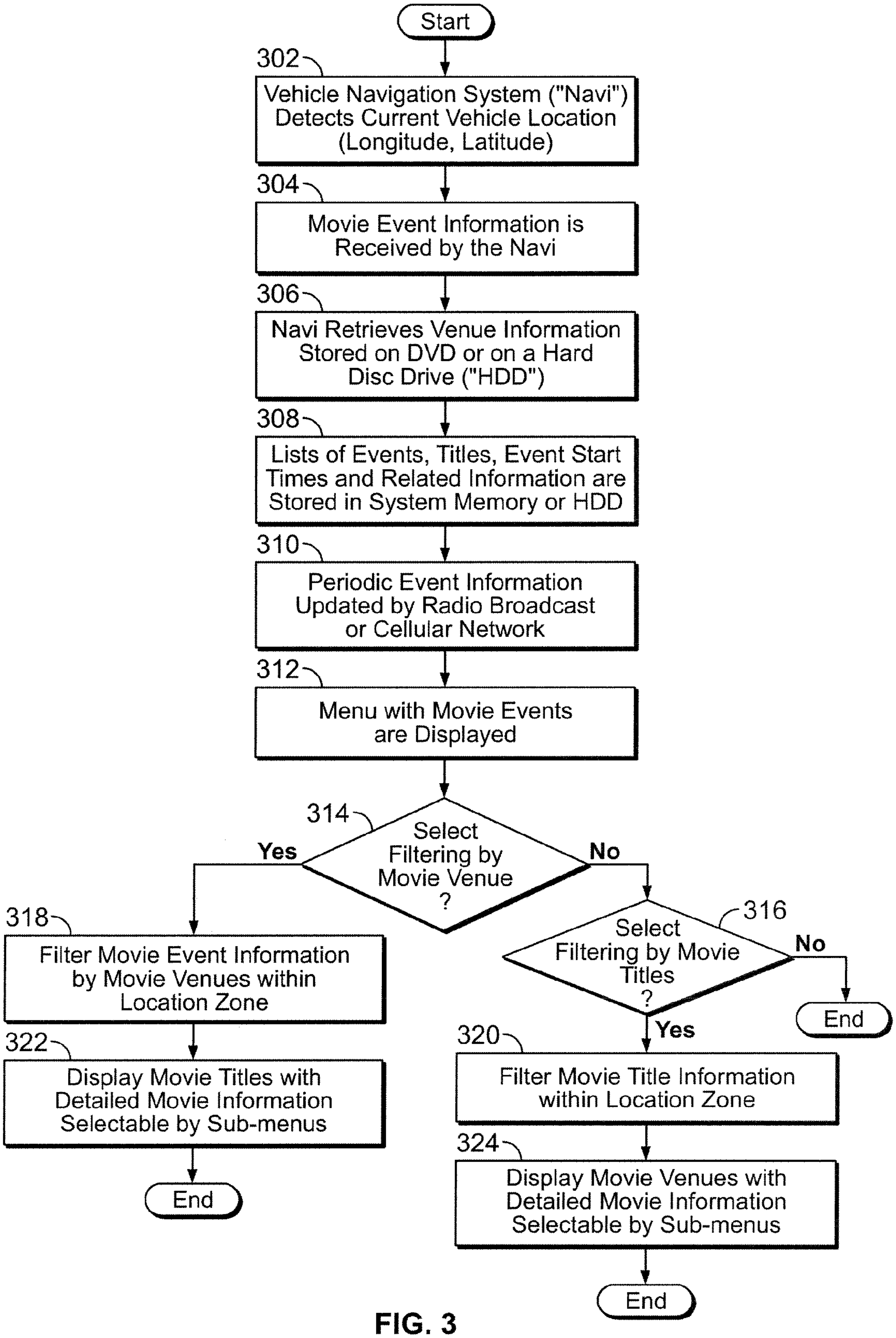
FIG. 3 is a flowchart of a method for providing a vehicle user with filtered event program information.

FIG. 3 is a flowchart of a method for providing a vehicle user with filtered event program information. Event program information can comprise such time sensitive event program information as movies (titles, show times, reviews, theater listings, etc.), sports events, plays, operas, concerts, etc. In the exemplary application shown in FIG. 3, event program information provided to the user by the navigation system is movie related information. At step 302, a navigational system determines the current location of a vehicle via a navigation device ("Navi"), e.g., a longitude and latitude position utilizing a GPS. At step 304, the system receives movie event information, e.g., movie titles playing at various theaters and the corresponding movie show times from a broadcast network. For improved system performance (i.e., less waiting time for the Navi to display the menus of step 312) at step 306, the Navi can optionally store and retrieve movie theater facility or venue information from an onboard DVD player or hard disc drive ("HDD"). Information on the HDD can include updates to the venue information or the entire database of information that is received from the broadcast network at step 304. This information is received by the system via the broadcast network. The information is then sent to a microprocessor in the Navi for processing. In a variation of the method, a semiconductor memory unit with an optional battery backup system can be utilized in place of the DVD or HDD. At step 308 the system stores movie event data such as titles, descriptions, cast listings and promotional poster icons received from the broadcast network at step 304 on the onboard HDD or the system memory and sends the information to the Navi for processing. Periodically, event information is updated on various schedules via broadcast network, cellular network, or an Internet connection at step 310 and stored on the HDD or the system memory. For example, movie show times may be updated weekly, while movie titles, descriptions, etc. may be updated bi-weekly in the background when the ignition is turned on and/or the vehicle is being driven. At step 312, the various types of movie and venue information retrieved at steps 304-310 are all cross-referenced so that the Navi displays multiple levels of menus and icons with all the available movie information (see FIGS. 4*a*-6).

At step 314, the Navi queries the user with the option of filtering movie program information by venue. If the user has elected to filter movie program information by venue, then at step 318, the system filters movie program information by the vehicle's current location, so that at step 322, only movie titles and accompanying movie information will be displayed by the venues that are located within a given distance from the vehicle's current location. The criteria for filtering venues for display from the vehicle's current location can be pre-set or pre-defined as a user preference. In a variation of the embodiment, the filtering at step 318 is such that only venues within the same geographical zone or postal code as the vehicle's current location will be displayed to the user by the Navi at step 322. The filtering step of 318 can also filter the information displayed to venues that are within a particular number of zones away from the vehicle's current location as has been pre-set or per-defined as a user preference. In another variation of this embodiment (not shown), the Navi offers the user the option of filtering the movie information presented a second time, wherein the movie information filtered by venue is now filtered by movie title so that the user is able to view movie information sorted by title for only the theater venues located within the given distance of the vehicle, as discussed above.

If the user has not elected to filter movie program information by venue at step 314, then at step 316, the Navi queries the user with the option of filtering movie program information by movie title. If the user has elected to filter movie program information by title, then at step 320, the system filters movie program information by title, so that at step 324, only the movie titles and accompanying movie information are displayed for movie titles that are screening at movie venues within a given distance from the vehicle's current location. The criteria for filtering venues for display from the vehicle's current location can be pre-set or pre-defined as a user preference. As described above, in a variation of the embodiment, the filtering at step 320 is such that only venues within the same geographical zone or postal code as the vehicle's current location will be displayed to the user by the Navi at step 324. The filtering step of 318 can also filter the information displayed to venues that are within a particular number of zones away from the vehicle's current location as has been pre-set or per-defined as a user preference. In another variation of this embodiment, the Navi presents the user with the option of starting the filtering process over again by venue at step 314. Finally, if the user has not elected to filter movie program information by title at step 316, the method ends.

FIG. 4*a* is a data table or database showing an example of entries in a Facility ID database for the venues that can be cross-referenced to other event program information such as the entries in the Event ID database (see FIG. 4*b*) and the Show Time Database (see FIGS. 5*a*-5*b*), discussed further below. Column 402 contains the Facility Identification Number or F-ID # that has a code number for each available movie theatre venue or facility. Columns 502-508 contain database entries that are associated with a particular F-ID# of column 402. Specifically, Column 502 contains the venue name for a particular movie theatre, Column 504 contains the street address, Column 506 contains the telephone number and column 508 contains the longitude and latitude. This database, as well as the databases shown in FIGS. 4*b*-5*b*, can be stored on the Navi DVD or HDD and used as a filtering criteria for event program information, as discussed with regard to the method outlined in FIG. 3.

FIG. 4*b* is a data table or database showing an example of entries in an Event ID database for event titles that can be cross-referenced to other event program information. Column 404 contains the Event Identification Number or E-ID# that has a code for each currently playing movie title. Columns 510-514 contain database entries that are associated with a particular E-ID# of column 404. Specifically, Column 510 contains the movie title, Column 512 contains the movie description, and column 514 contains the list of actors or cast members. It should be appreciated that other columns can be added to the data table for other types of related movie information, such as movie reviews and movie promotional icon image files.

The entries in the exemplary database of FIG. 4*b* are updated when new movie titles are received by the daily updates received by a receiver unit or section of the navigation system, as discussed with respect to FIG. 3 above. As the available system memory or HDD space becomes full, old E-ID #s are deleted, starting with the oldest entries. That is, in one approach, deletions are made in reverse chronological order (first in first out or "FIFO"). Additionally, as will be discussed further below with respect to FIG. 5*a*, there can be a database field cross-referenced to the F-ID# and E-ID# that contains an expiration date for the movie show time data. The E-ID#s can be automatically deleted out of the database when the expiration date arrives.

Figures 5A, 5B, 6:
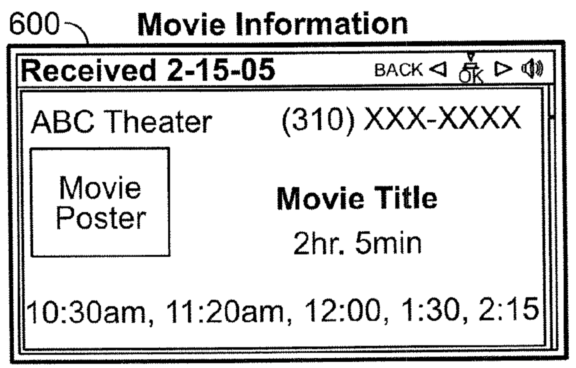
FIG. 5*a* is a data table showing an example of show time data entries in database for Event ID#s that are cross-referenced to Facility ID#s.
FIG. 5*b* is a data table showing an example of show time data entries in database for Event ID#s, wherein multiple Event-ID#s are cross-referenced to a single Facility ID#.
FIG. 6 is a schematic diagram showing a display example on the vehicle navigation system illustrating movie information for a particular movie playing at a particular facility.

FIG. 5*a* is a data table or database showing an example of show time data entries in a database for Event ID#s that are cross-referenced to Facility ID#s. Column 402 contains the Facility Identification Number or F-ID # and is associated with a particular E-ID# in column 404. Column 406 contains the event program data. The entry shown in FIG. 5A contains the movie start times on a 24-hour clock format. In another embodiment, (not shown) there are two sets of database fields for event program data for a given E-ID#. Specifically, there is one database field with the movie start times for week days and a second similar database field for movie start times on weekends. Column 408 contains an expiration date for the movie show time data, which may be useful for maintenance of the database. The E-ID#s can be automatically deleted out of the database when the expiration date arrives. This feature allows the database to have available space for new entries to be added by the periodic updates received via radio broadcast, cellular network or Internet connection.

FIG. 5*b* is a data table or database showing an example of show time data entries in a database for Event ID#s, wherein multiple Event-ID#s are cross-referenced to a single Facility ID#. This data table is essentially the same as the data table of FIG. 5*a*, except that there are additional E-ID# entries, together with the associated entries in columns 406 and 408. Specifically, many movie theaters are multi-screen venues with multiple movie titles screening at alternate times within the same facility, so that multiple E-ID#s are listed in column 404 for a given F-ID#.

FIG. 6 is a schematic diagram showing an example display 600 on the vehicle navigation system illustrating movie information for a particular movie playing at a particular facility. This screen shows one embodiment of a display screen image that provides the user with the name of the movie facility, the telephone number of the theater, movie title, running time, show times and an icon with a promotional poster image. The screen of the Navi can be a touch screen, wherein the user can touch the various items displayed to call-up additional screens with sub-menus to provide various types of additional movie related information such as movie trailers, movie descriptions, cast members, ticket prices, movie reviews, etc. One of skill in the art will recognize that the use of other user input methods, such as push buttons, knobs, switches or the like, are within the spirit and scope of the present invention. The Navi screen can also display various routes to a particular venue at a particular time and provide estimated time of arrival (not shown).

Figure 7A:
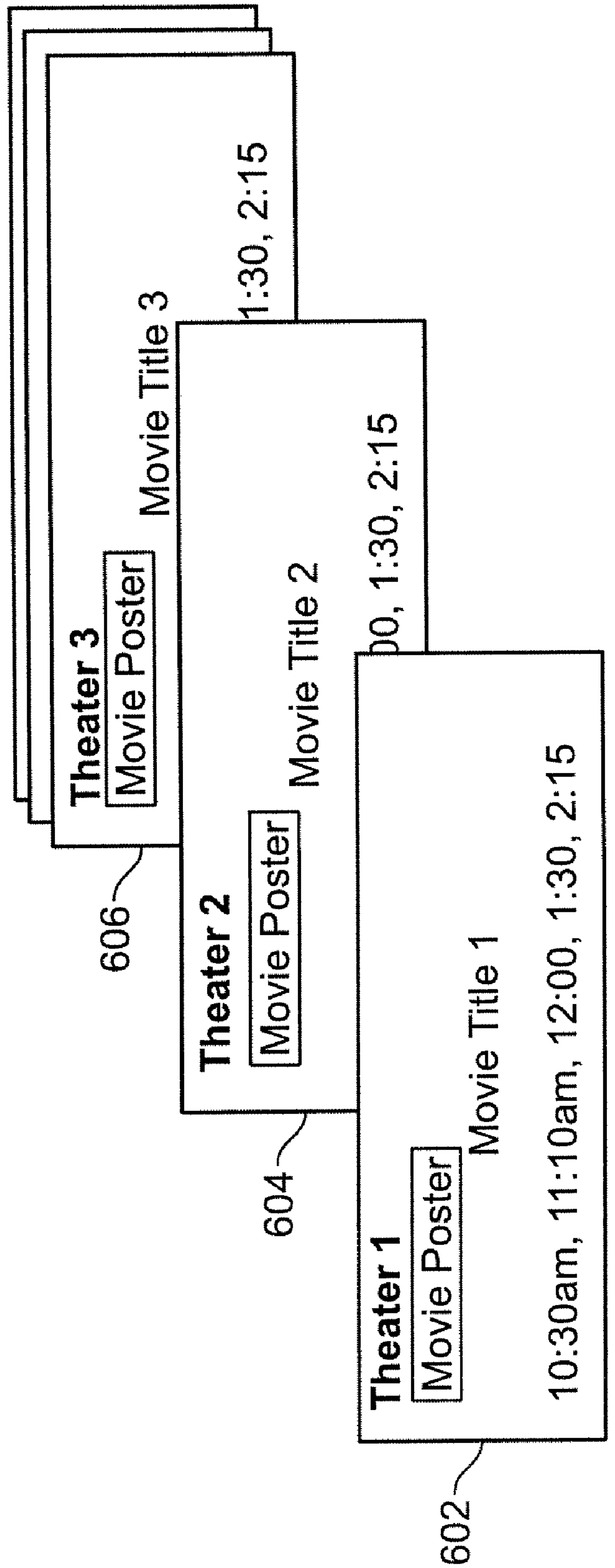
FIG. 7*a* is a schematic diagram of an conventional method of broadcasting the entire event program information to the vehicle navigation system when the user accesses the system.

FIG. 7*a* is a schematic diagram of an conventional method of broadcasting the entire event program information to the vehicle navigation system when the user accesses the system. Items 602-606 are representations of the database information that is needed for the Navi to display the event program information for the movie facilities in the United States. With the conventional method of providing event program information to vehicle users, the vehicle navigation system does not maintain the needed data in system memory, on a hard disk drive, or a DVD disc. Thus when a user desires to view such information, it is received via broadcast or cellular network. The downloading of such a large volume of data requires a significant amount of data bandwidth, as well as long wait times for the user.

Figure 7B:
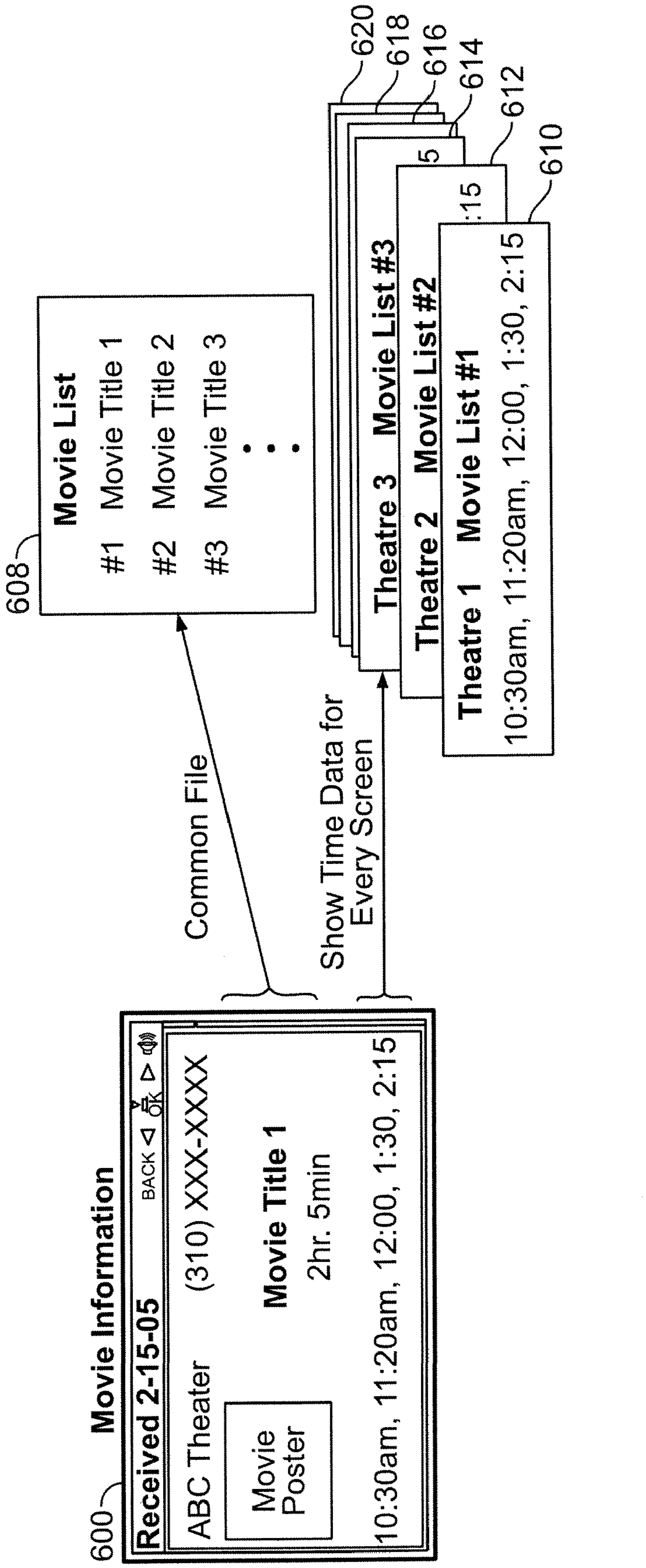
FIG. 7*b* is a schematic diagram of an improved method of broadcasting event program information in segments at different times periodically to the vehicle navigation system and storing the information in the system memory for quicker user access times.

FIG. 7*b* is a schematic diagram of an improved method of broadcasting event program information in segments at different times periodically to the vehicle navigation system and storing the information in the system memory (e.g., hard drive or DVD disc) for quicker user access times. The information displayed on the example display 600 is comprised of various lists or databases with database entries 610-620 (see database columns 502, 510, and 406 in FIGS. 4*a*, 4*b*, and 5*b*, respectively) for each movie screen at each movie facility that are updated in accordance with a desired schedule (E.g., daily, weekly, etc.). The database entries 610-620 are combined by the navigation system with a movie list or database 608 that contains movie program information that changes less frequently than database entries 610-620 and in the embodiment shown, is updated weekly, though other update frequencies are possible. As shown in FIG. 7*b*, database 608 contains movie titles; however, database 608 can also contain other movie program information such as movie descriptions, movie reviews, promotional posters, and movie trailer videos (see database columns 512, 514 in FIG. 4B).

There are approximately 50,000 movie theaters in the United States. Movie industry analysts estimate that 95% of the potential movie viewing audience is interested in viewing the top 20 popular movies at any given point in time. Thus, the data bandwidth necessary to maintain a database of movie program information can be reduced by broadcasting this information for only the top 20 popular movies for all 50,000 theater facilities. Further, in delivering movie database content or data via a multicast broadcast to vehicle navigational devices, the use of a digital fountain protocol to encode the broadcast data minimizes the needed time and bandwidth to deliver the movie database data substantially error free. The required data bandwidth can be further reduced by the use of known data compression methods. As discussed above, by updates to the database entries 610-620 and database 608 may be sent at different times in the background when the vehicle's ignition switch is on, such as when the vehicle is being driven by the user. These bandwidth reduction methods together with the method of storing the Facility ID database described herein, greatly reduce the waiting time of the user that wishes to utilize the Navi to obtain movie program information.

Figure 8:
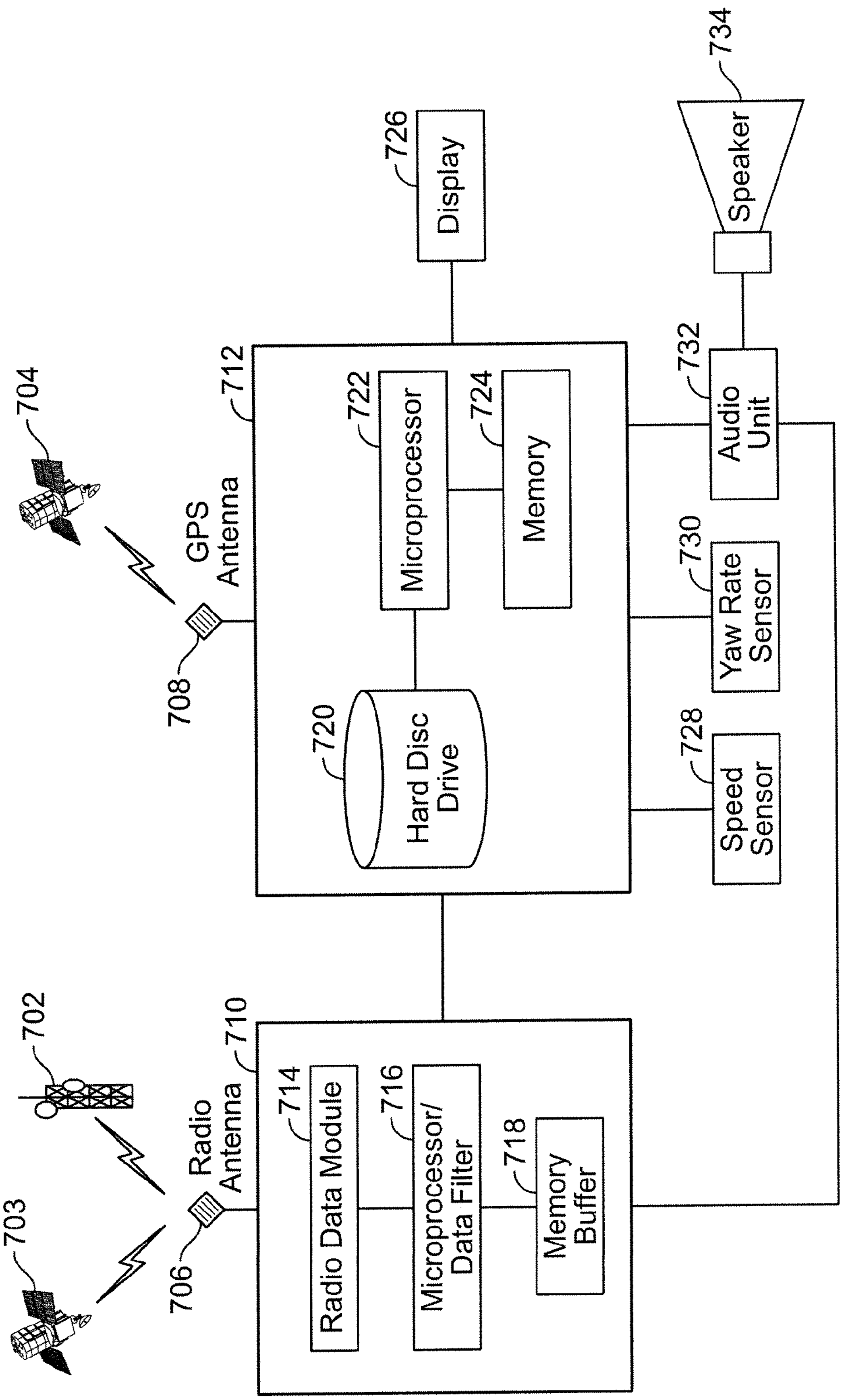
FIG. 8 is a schematic diagram of one embodiment of a system that can display filtered event program information in an expedited manner.

FIG. 8 is a schematic diagram of one embodiment of a system that can display filtered event program information to a user in an expedited manner. When a vehicle navigation system receives event program data broadcasts, a data filter is commonly utilized to reduce unnecessary data from the data received. For example, the filter can be used to discard all movie program information for theatres beyond a set distance from the vehicle's current location. An existing method of reducing user wait time while the vehicle navigational system is initializing and processing the received data utilizes a data packet filter that removes redundant data being repeatedly broadcast. This is accomplished by the data packet filter checking the cyclic redundancy code ("CRC") of the data packets. The use of cyclic redundancy codes with broadcast data messages is more fully explained with respect to FIGS. 9*a* and 9*b* below. Such a method of reducing duplicate data is an improvement over methods that do not check the CRC for duplicates (those methods merely use the CRC codes to verify data integrity and reduce transmission errors); however, the embodiment shown in FIG. 8 significantly reduces the wait time for a user that wishes to use the navigation system to obtain location-based movie event information as compared to solely using CRC codes to eliminate duplicate data.

The navigational system illustrated in the embodiment of FIG. 8 operates similar to the embodiment of FIG. 1*c*, described above, but has additional components and features described below. The embodiment of FIG. 8 comprises a satellite-based or digital FM-based radio broadcast antennas 702 and 703, satellite-based broadcast antenna 704, radio antenna 706, GPS antenna 708, data receiver unit 710, navigational device or Navi 712, display unit 726, speed sensor 728, yaw rate sensor 730, audio unit or voice output device 732, and speaker 734. The data receiver unit 710 comprises a radio data module 714, a microprocessor/data filter 716, and a memory buffer unit 718. The navigational device 712 comprises a hard disk drive 720, a microprocessor 722, and a memory unit 724.

Looking closer now at the Navi 712, the microprocessor 722 processes user commands entered on the display unit 726 or other input device (not shown), as well as the location data received via the GPS antenna 708 and filtered database information from the microprocessor/data filter 716. The memory unit 724 can include at least a portion of a user profile and in some embodiments may include the entire user profile that stores user preferences such as favorite movie theater venues and/or distances from the vehicle's current location that the user is interested in using as a filtering criteria. The memory unit 724 includes a road map database portion, an event venue information or Facility ID database and, in some embodiments, includes a DVD unit for reading road map information not built into the navigation device. A plurality of other database information and database updates, such as movie titles, show times, cast listings, and movie reviews, are received from the data receiver unit 710 and are stored in the memory unit 724. Further, filtered data such as event program information and movie titles sent by the data receiver unit 710 are also stored in the memory unit 724.

The speed sensor 728 and the yaw rate sensor 730 are in electrical communication with the Navi 712 and are used to determine estimates of times to arrive at event program venues, such as movie theaters where a desired movie is playing, from the vehicle's current location. The speed sensor 728 and the yaw rate sensor 730 can also be used to determine the most efficient travel routes to the desired event program venue. In one embodiment, the estimated times to travel to a plurality of the event program venues are displayed to assist the user in deciding which event venue she would like to choose or receive further information about from the Navi 712.

The audio unit 732 is in electrical communication with the data receiver unit 710, the Navi 712, and the speaker 734. The audio unit 732 comprises an audio processor (not shown), an amplifier (not shown), and a speech synthesizer (not shown). The audio unit can provide verbal warnings and announcements to the user, as well as driving directions by the coupling of the audio unit 732 to the speaker 734. The audio unit 732 also provides audio for movie trailers and preview videos. Variations of this embodiment include the use of confirming tones or beeps that can be produced when a user selects a command or menu on the display unit 726. Another variation utilizes a human voice synthesis of the text portion displayed on the display unit 726 such as the names of movies, theaters and movie descriptions. The speaker 734 can be the same device used by the user to listen to radio, CD-ROM, DVD and other audio sources accessed in the vehicle by the user.

The display unit 726 is in electrical communication with the Navi 712 and displays a variety of types of information to the user, such as digital maps and routes that guide the user to an event venue location, as well as event program information with a variety of submenus. The display can show text, images and video clips such as movie trailers and promotional poster image icons for movies. The display unit 726 can be a touch display that shows icons that are activated when a user touches them with her finger.

Looking closer now at the data receiver unit 710, the microprocessor/data filter or filter 716 processes a plurality of types of data received by the radio data module 714 and updates data stored in the hard disk drive 720 and memory unit 724. A key function of the filter 714 is that it filters the large volume of data received by the data module 716 so that only information relevant to a user is sent to the Navi 712 for processing and ultimately display by the display unit 726.

As discussed further below with respect to FIGS. 12-15, in many vehicle navigation system applications, the data receiver unit 710 initializes quicker than the Navi 712 and the receiver unit 710 must wait for the slower to initialize Navi 712 to communicate instructions and data before the filter 716 can complete the data filtering function. The use of the memory buffer unit 718 allows the receiver unit 710 to receive, process, and filter data received in substantially real time from the antennas 702 and 703, as well as event program data previously received from the Navi 712 shortly after the vehicle's ignition is switched on. More specifically, before the vehicle's ignition was turned off last cycle, the memory buffer 718 was sent the vehicle's current location coordinates and portions of the event program database data by the microprocessor 722. Shortly after the ignition switch is turned on, periodic data broadcasts are received from the antennas 702 and 703, and the filter 716 can start processing and filtering both the data received and the event program information stored in the memory buffer 718. The resulting filtered data can then be temporarily stored in the memory buffer 718 until the Navi 712 initialization is completed and the Navi 712 can receive outgoing data from the data receiver unit 710.

Figure 9A:
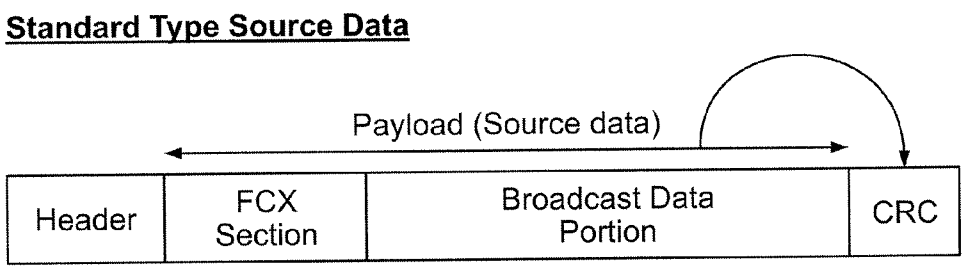
FIG. 9*a* is a block diagram of an embodiment of a single-packet broadcast data message with header and cyclic redundancy codes.

FIG. 9A is a block diagram of an embodiment of a single-packet broadcast data message. The data message contains a single broadcast data portion that is intended for a plurality of vehicles in accordance with certain criteria as defined by a filter code section ("FCX"). For example, the FCX may define certain characteristics of vehicles to which the message applies, such as vehicle type, model year, mileage, sales zone, etc. A Vehicle Identification Number ("VIN") code may also be used. For example, the filter code section may identify all 2002 Acura RL models operating in Los Angeles, Calif. (or within certain geographic zones or postal zip codes). All vehicles receiving broadcasts from the center would receive the same broadcast data message.

The mobile unit 18 (shown in FIG. 1*a*) or RF transceiver 152 (shown in FIG. 2) in the vehicles 12, 112, respectively, receives the entire broadcast data message and a filter processing section uses the FCX to identify message portions that are intended for the vehicles 12, 112. Message portions that are not applicable to filter criteria set by the user or vehicle manufacturer (discussed in more detail below) for the vehicles 12, 112 are discarded by a filter processing section located within the mobile unit 18 or the RF transceiver 112. The intended messages are then stored in the memory 30 (shown in FIG. 1*c*) or on a hard-drive (not shown) and indexed by an applicable criteria. A Broadcast Data Header provides information about a Broadcast Data portion, including instructions and preferences about the manner and timing of presentation of the Broadcast Data portion to the vehicle operator. The Broadcast Data Header can contain such information as a symbol code for the type of message, a data activation date and an expiration date (of particular importance with respect to event program information such as movie show times, discussed in further detail below). The filter processing section in the vehicles 12, 112 would use the criteria defined in the filter code section together with the Broadcast Data Header to determine whether to present the data message to the vehicle operator or to discard the data message. The data message can include a header, a payload section, and a cyclic redundancy code.

The payload section, which is between the header and the CRC code, includes the filter section and the broadcast data. The CRC code may be generated using any suitable algorithm, such as, but not limited to, the following polynomial function:

$$G(X)=X^{16}+X^{15}+X^{2}+1$$

Figure 9B:
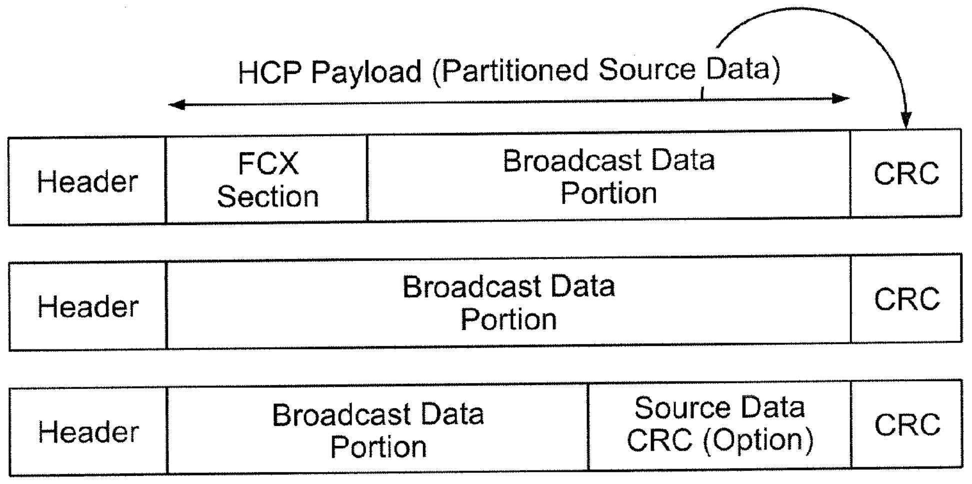
FIG. 9*b* is a block diagram of a multi-packet message partitioned into multiple parts with header and cyclic redundancy codes.

It should be appreciated that when the same message data is broadcast to plural vehicles of a common group, and when there are large numbers of target vehicles in the target group, the overall data amount is small (i.e., the broadcast efficiency is high). The payload section may include one set of broadcast data or multiple sets of broadcast data. That is, depending on the length of the message body, the broadcast message may be a single packet or multiple packets in length. For a single packet message, a header and CRC code is created and added to the Source Data to produce the Broadcast Data Packet. Alternatively, for a multiple packet message, the message body is partitioned into sections and each section has a header and CRC code added thereto. Separate Broadcast Data Packets are produced from each section, as shown in FIG. 9B. It will also be understood that the CRC code is merely exemplary, and that any other suitable method of checking for errors in the data message can be implemented with the present invention.

FIG. 9*b* is a block diagram of a multi-packet message partitioned into multiple parts. When the source data of a broadcast data message is long, it may be divided into multiple parts for broadcast. In FIG. 9*b*, a broadcast data message is broken into three parts, in which the first part (top) includes the FCX and the beginning of the broadcast data portion, the second part (middle) includes a continuation of the broadcast data portion, and the third part (bottom) includes a further continuation of the broadcast data portion. The multiple parts of the message are formulated into separate messages for broadcast, by appending a header to the beginning of each portion and a CRC code to the end of each portion. Each of the separate messages would have a common Data Serial Number in the header so that the filter processing section can recognize the relationship between the messages and thereby reconstruct the original source data.

It should be appreciated that the use of the source data CRC can ensure reliability of reconstruction of the multiple partitioned source data. But, the source data CRC also takes up data space that reduces the broadcast efficiency of the message. Accordingly, the source data CRC could be used selectively for instances in which high reliability is necessary or large data files are being broadcasted.

Figure 10:
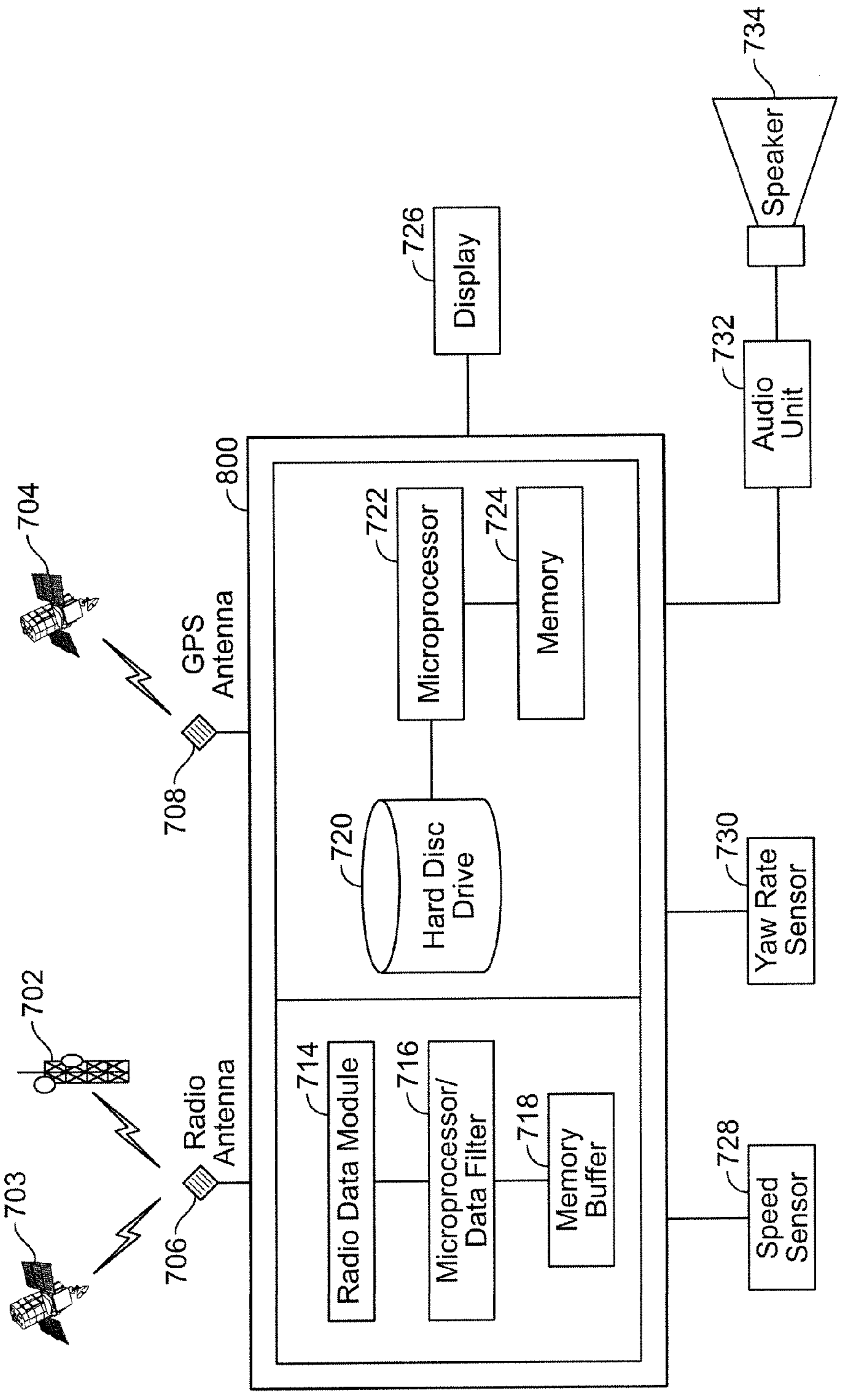
FIG. 10 is a schematic diagram of another embodiment of a system that can display filtered event program information to a user in an expedited manner.

FIG. 10 is a schematic diagram of another embodiment of a system that can display filtered event program information to a user in an expedited manner. This embodiment is essentially a variation of the embodiment of FIG. 8 and contains many of the same components as the embodiment of FIG. 8. One difference is that the data receiver unit 710 and the navigational device 712 are now physically integrated into one device, namely, a vehicle information unit 800, wherein the data receiver unit 710 and the navigational device 712 are no longer discrete units, but are sections of one device.

Figure 11:
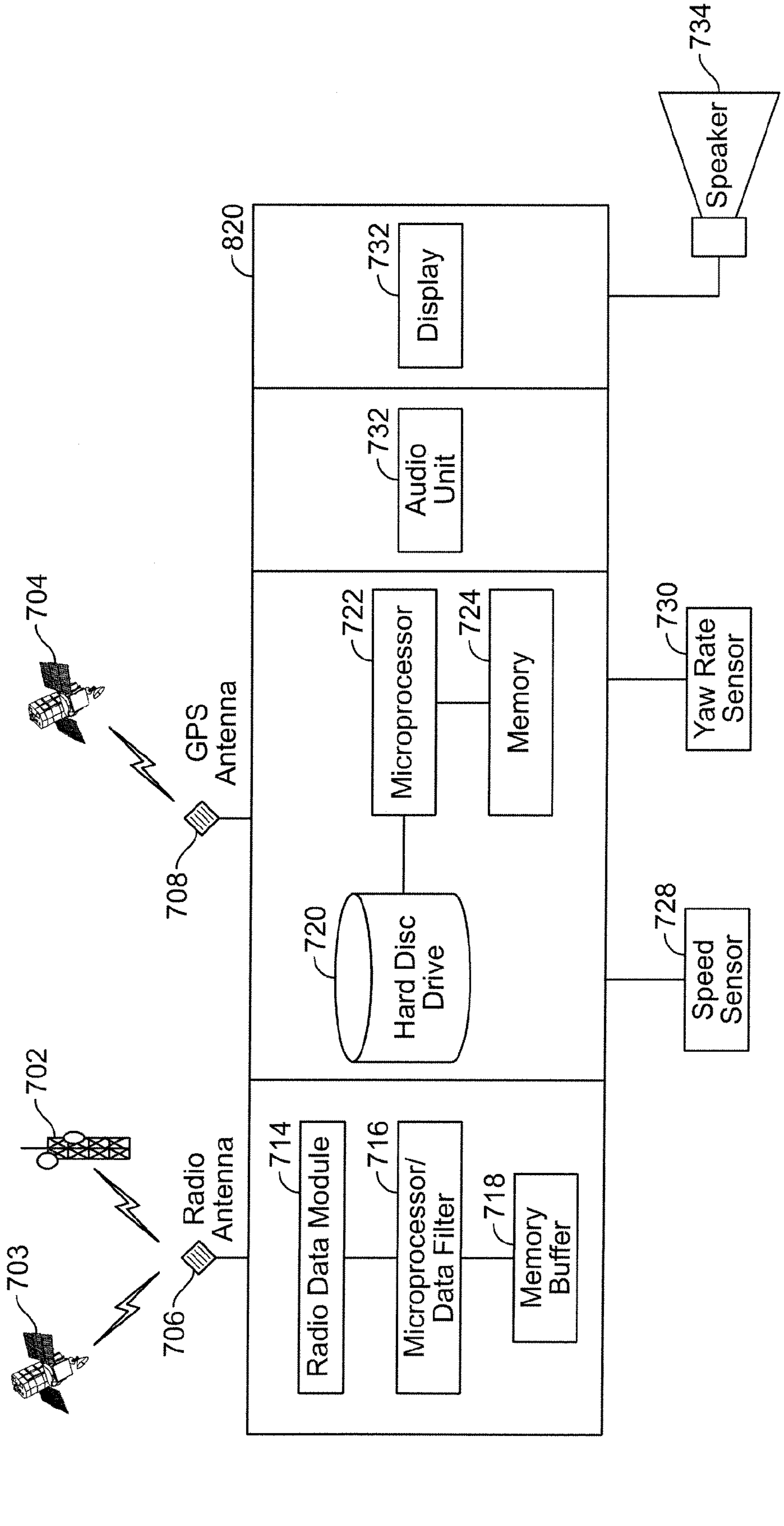
FIG. 11 is a schematic diagram of yet another embodiment of a system that can display filtered event program information to a user in an expedited manner.

FIG. 11 is a schematic diagram of yet another embodiment of a system that can display filtered event program information to a user in an expedited manner. This embodiment is essentially a variation of the embodiments of FIGS. 8 and 10 and contains many of the same components as the embodiments of FIGS. 8 and 10. One difference is that in addition to the data receiver unit 710 and the navigational device 712 being physically integrated as sections in the vehicle information unit 800 (shown in FIG. 10), the audio unit 732 and the display unit 726 are also integrated thereto. The resulting integrated unit in the embodiment of FIG. 11 is an integrated vehicle information/audio unit/display unit 820.

Figure 12:
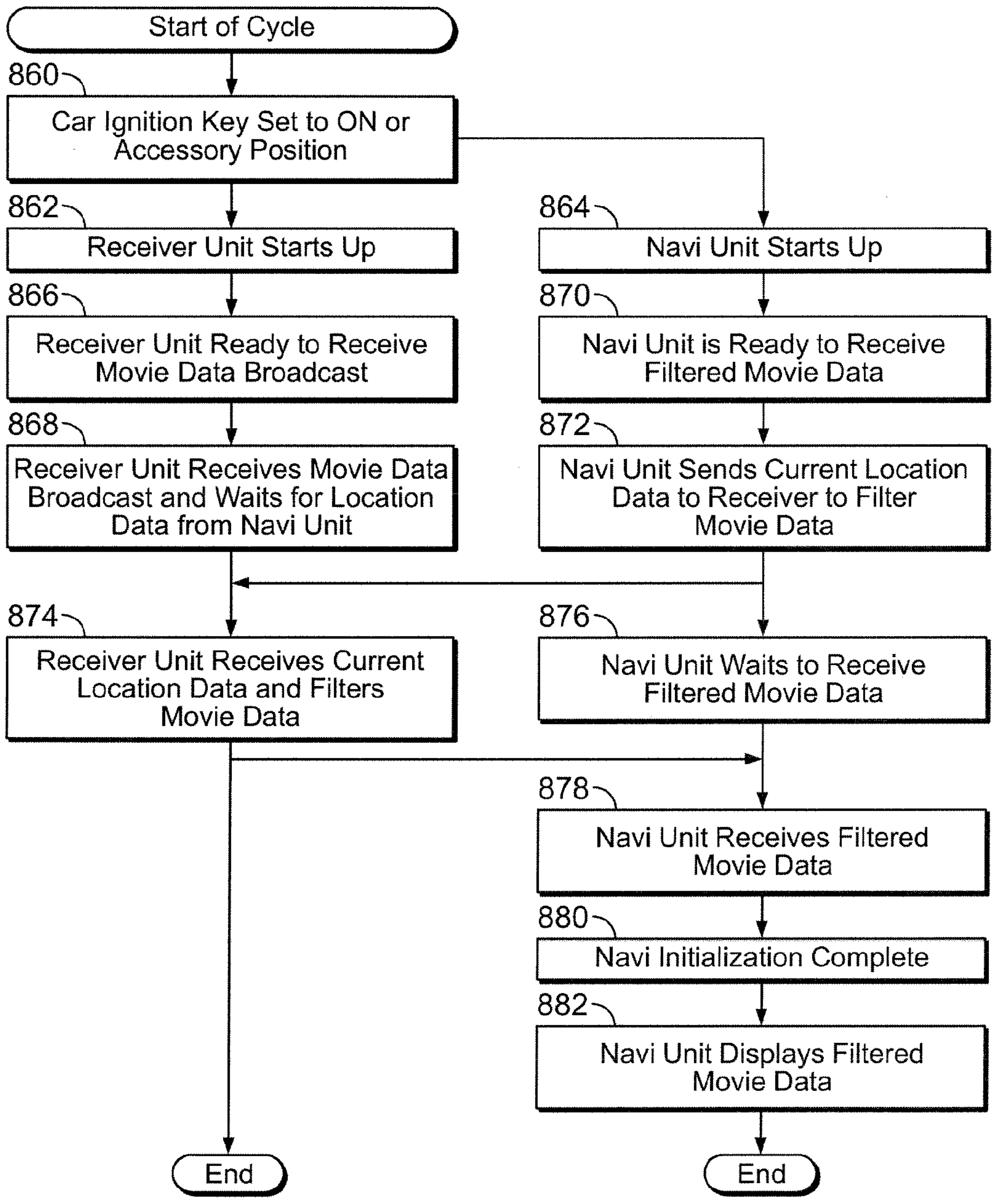

FIG. 12 is a flowchart of a method for displaying filtered event program information to a user of the vehicle navigation system after the vehicle ignition is turned on. At step 860, the vehicle ignition is turned on (i.e., set to the "On," "Accessory" or similar position). It will be understood that other methods of signaling to the Navi to power on are within the spirit and scope of the present invention. At step 862, the broadcast receiver unit starts the initialization process. Simultaneously, at step 864, the Navi starts the initialization process, which with many existing vehicle navigation systems takes significantly longer to complete than the receiver unit does. The long initialization process is due at least in part to the fact that the Navi needs to wait for an internal GPS receiver to search for and collect GPS information (or signals) broadcast from four or more GPS satellites that are in view of the GPS receiver. At step 866, the receiver unit is ready to receive movie program data that is broadcasted by various methods such as digital FM radio broadcast, cellular telephone network or satellite radio.

It will be noted that in some embodiments the movie program information has been previously sent to the receiver unit and has been stored in either semiconductor memory and/or a hard disk drive located within the receiver unit, so that the receiver unit is only updating the database with the data received from the broadcasted data. Because the receiver unit generally has a finite amount of memory, a First-in, First-Out method can be used to maintain the database. That is, when the available memory becomes full, the oldest entries are deleted from the database first and the new data received is stored in those memory locations. In another approach, older entries are deleted and new entries are added to the database at defined time intervals (predetermined or otherwise). At step 868, the receiver unit receives broadcast movie program data and waits for location data to be sent to the receiver unit from the Navi. At step 870, the Navi is ready to receive filtered movie program data from the receiver unit, but the Navi must first receive multiple GPS satellite signals (generally four or more) and compute the vehicle's current location. At step 872, the Navi sends the current location data to the receiver unit and at step 876 waits to receive filtered movie program data to be sent by the receiver unit.

At step 874, the receiver unit receives the current location data from the Navi and filters the movie program data utilizing an internal data filter unit. The filtered data is then sent to the Navi. At step 878, the Navi receives the filtered movie program data and at step 880, the Navi initialization is complete. Finally, at step 882, the Navi displays the filtered movie program data to the user with a series of icons and sub menus and the method ends.

Figure 13A:
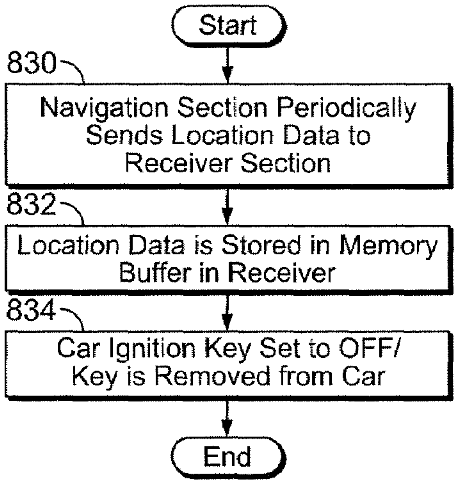
FIG. 13*a* is a flowchart of a method that stores vehicle location data periodically in a memory buffer unit.

FIG. 13*a* is a flowchart of a method that stores vehicle location data periodically in a memory buffer unit. At step 830, the navigation section or navigation unit or Navi periodically sends the vehicle's current location data to the receiver section or receiver unit. At step 832, the location data sent by the Navi is received and stored in a buffer memory unit located within the receiver section. At step 834, the ignition is switched off (or the ignition key is removed from the ignition switch) and the current navi cycle ends. This can occur when a user parks her car and leaves her vehicle. It will be understood that other ways of signaling to the Navi to power down are within the spirit and scope of the present invention. The method then ends and the end of a Navi cycle has been reached.

Figure 13B:
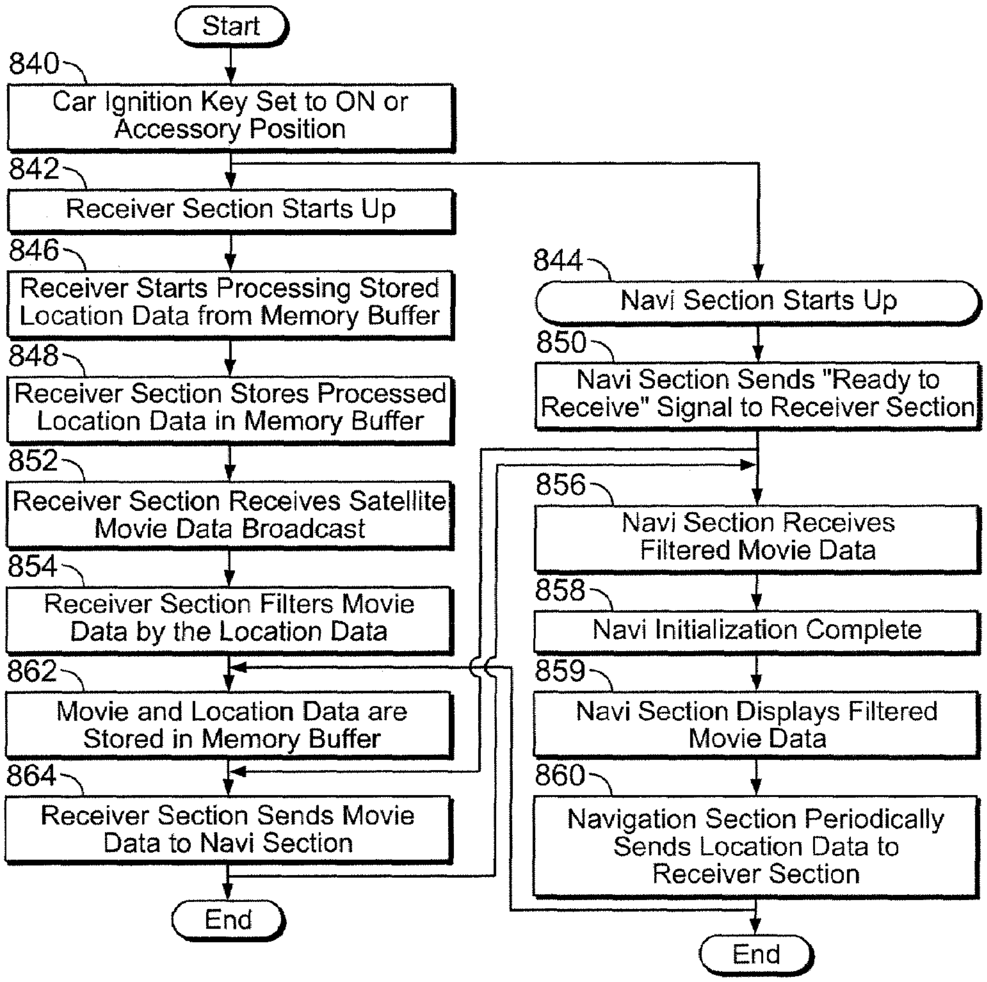

FIG. 13*b* is a flowchart of an improved method that displays filtered event program information to a user of the vehicle navigation system in an expedited manner, after the vehicle ignition is turned on. In the embodiment illustrated, event program data comprises movie program data; however, as discussed above, event program data can also comprise other types of event program data such as sports event data, play event data, opera event data, concert event data, etc. At step 840, a new Navi cycle commences when the vehicle's ignition is turned on (i.e., set to the "On," "Accessory" or similar position). It will also be understood that other methods of signaling to the Navi to power on are within the spirit and scope of the present invention. At step 842, the broadcast receiver unit starts the initialization process. At step 844, the Navi starts the initialization process, which with many existing vehicle navigation systems, takes significantly longer to complete than the receiver unit does (as discussed above with respect to FIG. 12). Steps 842 and 844 can be performed simultaneously.

At step 846, the receiver unit starts processing location data that has been stored in step 832. As discussed with respect to FIG. 12, if the receiver has movie program information that has already been stored in either semiconductor memory and/or a hard disk drive (sent by the Navi section before the last cycle ended at step 836), the receiver unit begins to filter the movie program data filtered utilizing an internal data filter unit. The resulting filtered movie program data is stored in the memory buffer unit located within the receiver section. At step 852, the receiver section receives data updates to the movie program data that is broadcast by various methods such as digital FM radio broadcast, cellular telephone network or satellite radio.

In some embodiments, the movie program information has been previously sent to the receiver unit and has been stored in either semiconductor memory and/or a hard disk drive located within the receiver unit, so that the receiver unit is only updating the databases with the data received from the broadcasted data, thus utilizing significantly less data bandwidth. Because the receiver unit generally has only a finite amount of memory, a FIFO method is used to maintain the databases. That is, when the available memory becomes full, the oldest entries are deleted first and new data received is stored in those memory locations, as discussed above previously.

Next, at step 854 the updated data from step 852 is filtered and integrated with the movie program data stored in the receiver unit's semiconductor memory and/or hard drive. At step 862, the integrated data is stored in the memory buffer unit. Periodic location data updates received from the Navi section at step 860 (discussed further below) are also stored in the memory buffer at step 862. Next, at step 850, the Navi sends a "Ready to Receive" signal to the receiver section. Upon receiving this signal from the Navi section, At step 864 the receiver section waits for the Navi section to send a "Ready to Receive" signal that is generated at step 850. When the "Ready to Receive" signal is received by the receiver section at step 864, the receiver section then sends the filtered movie data to the Navi section and the first portion of the method (concerning the receiver section) ends.

After the Navi section has progressed sufficiently in the initialization process at step 844, the Navi section sends a "Ready to Receive" signal to the receiver section at step 850. At step 856, the Navi section is ready to receive data and the Navi section receives the filtered movie program data sent by the receiver section at step 864. Next, at step 858, the Navi section competes the initialization procedure. At step 859, the Navi section processes and displays the filtered movie program data to the user with a series of icons and sub menus. Finally, at step 860, the Navi section periodically sends the vehicle's current location data to the receiver section and the data is stored in the receiver section's memory buffer at step 862, as discussed above and the second portion of the method (concerning the Navi section) ends. By the use of the memory data buffer in the method of FIG. 13*b*, and in particular, the periodic updates of the vehicle's location being stored there, the receiver section is able to start filtering movie program data significantly faster than the method of FIG. 12 and this time savings will be readily apparent from the description of the timing diagrams of FIGS. 14 and 15 below, that correspond to the methods of FIGS. 12 and 13 just described.

Figure 14:
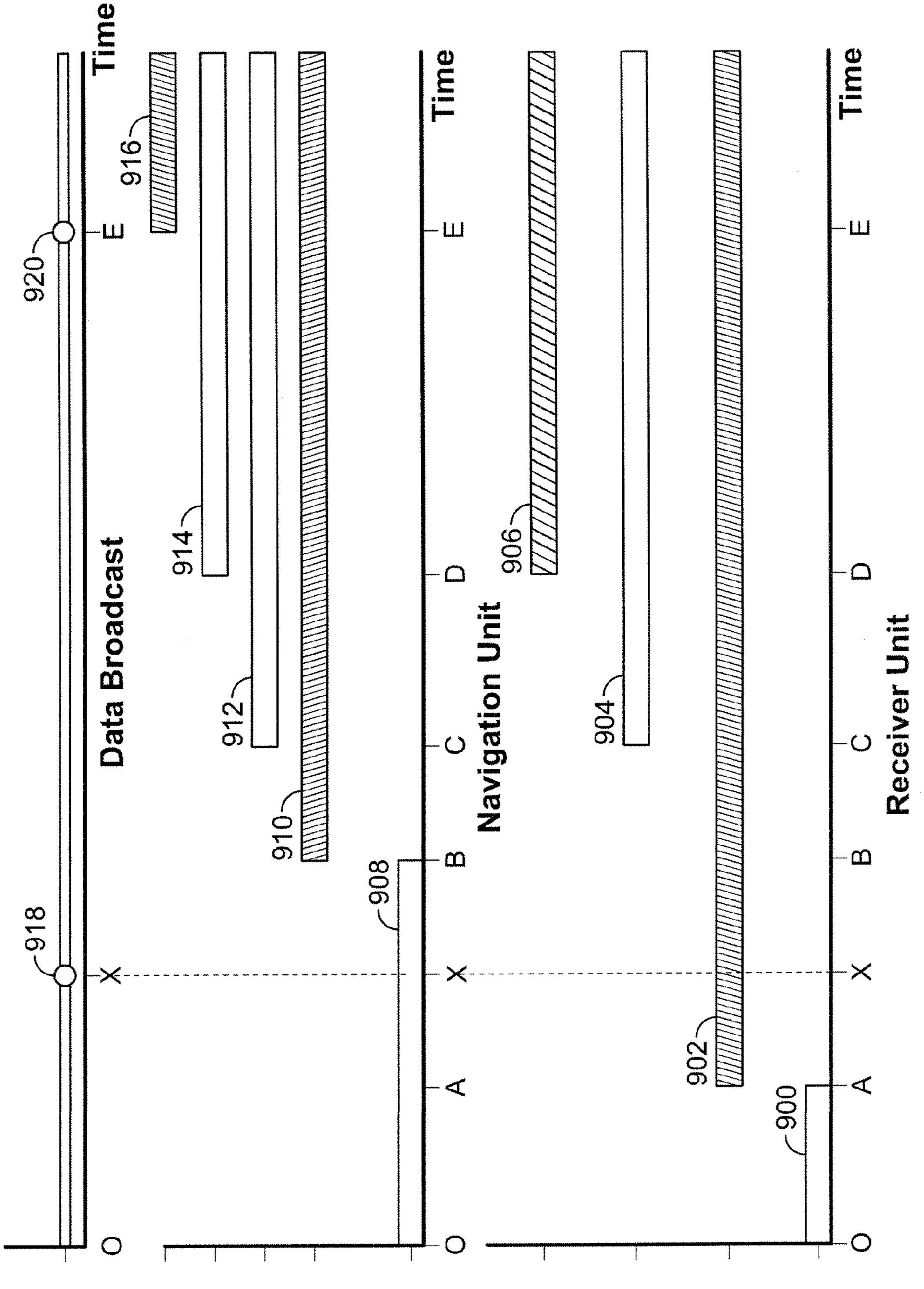
FIG. 14 is a timing diagram of a system for displaying filtered event program information to a user of the vehicle navigation system.

FIG. 14 is a timing diagram of a system for displaying filtered event program information or data to a user of the vehicle navigation system. In the embodiment, a timing sequence is illustrated for a vehicle navigation unit, a receiver unit and a series of data broadcasts. The operation of the receiver unit and the Navi are intertwined and as will be evident from the following description and the timing chart of FIG. 14, the Navi unit may require significantly more time to complete the initialization sequence than the receiver unit does. In fact, the Navi unit can be a bottleneck in the waiting time the user must endure before she can view the event program information (i.e., movie program information) on the Navi unit display screen.

At time 0, the receiver unit and the Navi start-up initialization sequences. Bar 900 illustrates that from time 0 to time A, the receiver unit is starting-up and bar 908 shows that the Navi is starting-up from time 0 to time X. Until Bar 900 reaches time A, the receiver unit cannot receive, send, or process data. Similarly, until time B, the Navi can not receive, send or process data or commands. Starting at time A, Bar 902 indicates that the receiver unit can now receive, process and filter data. In the provided embodiment, the data the receiver unit receives is the broadcast data that comprises a set of periodic data bursts of data packets that are broadcast by satellite radio, digital FM radio broadcast, cellular network, etc. Bar 910 shows that the Navi unit is able to receive filtered data sent by the receiver unit starting at time B, but as discussed in further detail below, there is not yet any filtered event program data being sent from the receiver.

At time X, a data packet 918 is broadcast. As shown by bar 902, the receiver unit can receive, process, and filter the data packet 918 at time X, but the receiver unit is waiting for the Navi unit to send the vehicle's current location data so that the receiver unit can filter the data packet 918 by location. In a variation of this embodiment, some of the event program data is stored in the receiver unit or Navi unit, but in such a case, the receiver unit must still wait to receive the current location data from the Navi unit before the event program information can be filtered.

With continued reference to the embodiment shown in FIG. 14, the Navi has reached the stage of initialization where it can send the current location data to the receiver at time C, as represented by bar 912. The receiver unit receives the location data at time C and starts filtering the event program information at time C, as shown by bar 904. At time D, the receiver unit sends the filtered event program information to the Navi, as represented by bar 906. The Navi completes the Navi initialization sequence at time D and as represented by bar 914, the Navi processes the filtered event program information. At time E, the Navi starts displaying the event program information to the user. Also occurring at time E is a broadcast of data packet 920. If any event program data has changed since time X or the reception quality at time X was too poor or inadequate for the receiver unit to process and filter the event program data, the receiver can revise the filtered data and send the revised event program data with little waiting time, as the Navi unit has been fully initialized by time E.

Figure 15:
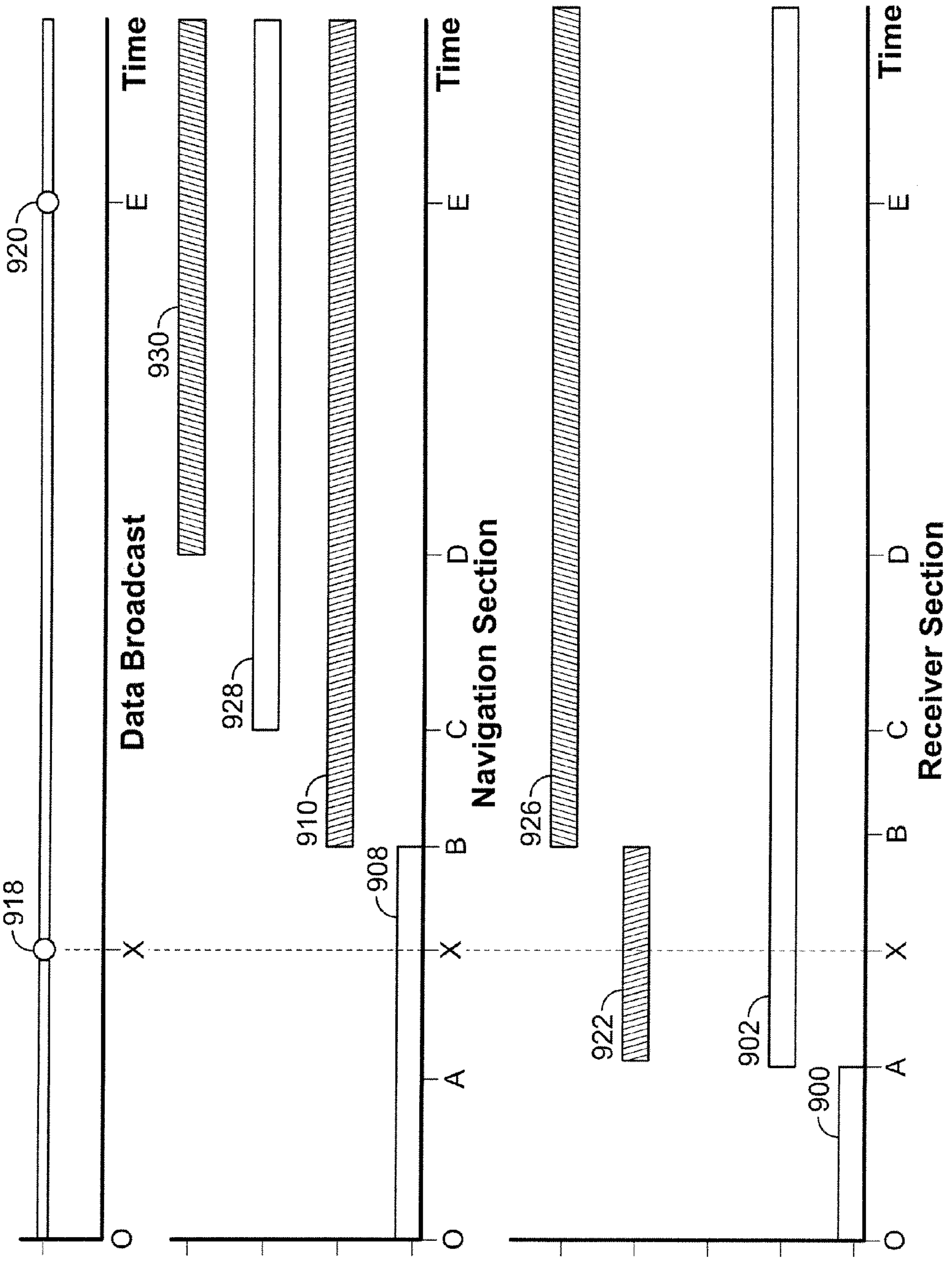
FIG. 15 is a timing diagram of an improved system fro displaying filtered event program information to a user of the vehicle navigation system more quickly than the system of FIG. 14, by use of a memory buffer in the receiver section.

FIG. 15 is a timing diagram of an improved system for displaying filtered event program information to a user of the vehicle navigation system more quickly than the system of FIG. 14, by use of a memory buffer in the receiver section. A major benefit of this improved embodiment is that the Navi is able to display the filtered event program data at time D instead of time E, as was the case with the embodiment of FIG. 14. An improvement to the embodiment of FIG. 14 that allows for this benefit is the use of a memory buffer unit in the receiver unit in conjunction with the storage of the current vehicle location from the last cycle of the Navi unit's operation, before the vehicle ignition switch (not shown) was turned to the "Off" position.

At time 0, the receiver unit starts an initialization sequence and simultaneously, but at a different rate, the Navi unit starts an initialization sequence as well. Bar 900 illustrates that from time 0 to time A, the receiver unit is starting-up and bar 908 indicates that the Navi is starting-up from time 0 to time X. Until Bar 900 reaches time A, the receiver unit can not receive, send, or process data. Similarly, until time B, the Navi unit can not receive, send or process data or commands. Starting at time A, Bar 902 indicates that the receiver unit can now receive, process and filter data. In the embodiment, the data the receiver unit receives is the data broadcast, that comprises a set of periodic data bursts of data packets that are broadcast by satellite radio, digital FM radio broadcast, cellular network, etc. Bar 910 shows that the Navi unit is able to receive filtered data sent by the receiver unit starting at time B. Unlike the embodiment of FIG. 14, the vehicle's current location data is stored in the memory buffer unit in the receiver section from the last cycle of operation of the Navi unit, just before the vehicle ignition switch was turned to the "off" position.

At time X, a data packet 918 is broadcast. As shown by bar 902, the receiver unit can receive, process, and filter the data packet 918 at time X using the location data stored in the memory buffer. In this embodiment, the event program data is also stored in the memory buffer unit, so that the receiver unit starts to process and filter the event program information at time A, as shown by bar 922. Because the Navi unit is not yet ready to receive any filtered data from the receiver unit until time B, the receiver unit stores the processed and filtered event program data in the same memory buffer as the location data until time B. At time B, the receiver unit sends the event program data to the receiver, as shown by bar 926. At time X, the data packet 918 is received by the receiver unit, as shown by bar 902; however, in this embodiment, the data packet 918 is used to update the event program data already stored in the memory buffer unit.

At time B, the Navi unit is ready to receive the processed and filtered event program data from the receiver section, as shown by bar 910. In this embodiment, the receiver unit is not sitting idle waiting for the location data to be sent, as was the case in FIG. 14. Instead, at time B, the Navi unit starts storing and processing the filtered data from the receiver unit. At time C, the Navi unit completes the initialization sequence and the Navi unit starts processing the event program data as shown by bar 928 so that at time D, the Navi unit displays the event program information filtered by location, as shown by bar 930. As was the case with the data packet 920 being broadcast at time E in the embodiment of FIG. 14, if any event program data has changed since time X or the reception at time X was too poor for the receiver unit to process and filter the event program data, at time E, the receiver can revise the filtered data and send the revised event program data with little waiting time to the Navi unit.

It will be noted that the improved methods and systems outlined in the figures herein described are merely exemplary embodiments of the present invention. In other embodiments, subsets, different combinations, and variations of the steps described with respect to the figures can be used to filter and buffer user searchable event program information and broadcast the event program information to a vehicle. Features of any of the foregoing methods and systems may be substituted or added into others, as will be apparent to one of skill in the art.

Having thus described a preferred embodiment of a method and system for providing location-based event program information to a user, it should be apparent to those skilled in the art that certain advantages of the within system have been achieved. It should also be appreciated that various modifications, adaptations, and alternative embodiments thereof may be made within the scope and spirit of the present invention. For example, the use of the memory buffer to allow the receiver section of the navigational system to begin processing and filtering event program data while the navigational section is initializing so that the navigational section is ready to display filtered information quicker than previously disclosed methods has been illustrated, but it should be apparent that many of the inventive concepts described above would be equally applicable to use with other non-broadcast communication networks.

What is claimed is:

1. A system for providing updated event information to a user of a vehicle, comprising:

a navigation unit for determining a geographic position of the vehicle;

a receiver for receiving event information updates from a remote location;

a memory unit; and a processor unit operatively coupled to the navigation unit, the receiver, and the memory unit, wherein the processor unit is programmed to:

store position data regarding the determined geographic position in the memory unit prior to a vehicle deactivation;

retrieve the position data from the memory unit after a vehicle reactivation;

use the position data to filter a first portion of the received event information updates to discard updates regarding events occurring farther than a predetermined distance from the determined geographic position of the vehicle; and generate the updated event information from the filtered event information updates, wherein the receiver and the navigation unit are initialized in response to the vehicle reactivation, and the first portion of the event information updates is received by the receiver after the receiver is initialized but before the navigation unit is initialized.

2. The system as recited in claim 1, further comprising a display unit for displaying the updated event information to the user.

3. The system as recited in claim 1, wherein the processor unit stores preliminary event information in the memory unit prior to the vehicle deactivation.

4. The system as recited in claim 3, wherein the processor unit generates the updated event information by updating the preliminary event information with the filtered event information updates.

5. The system as recited in claim 4, wherein the processor unit changes a first portion of the preliminary event information while leaving a second portion of the preliminary event information unchanged.

6. The system as recited in claim 1, wherein the navigation unit comprises a Global Positioning System receiver.

7. The system as recited in claim 1, wherein the processor stores the position data in the memory unit before vehicle's ignition is turned off.

8. The system as recited in claim 1, wherein the processor unit retrieves the position data after vehicle's ignition is turned on.

9. The system as recited in claim 1, wherein the processor unit retrieves the position data after the receiver unit is reactivated.

10. The system as recited in claim 1, wherein the receiver unit receives broadcast information updates.

11. The system as recited in claim 10, wherein the receiver receives the broadcast information updates via a satellite radio broadcast system.

12. The system as recited in claim 1, wherein the updated event information comprises movie information.

13. The system as recited in claim 1, further comprising an audio unit for providing the updated event information as an audible message for the user.

14. The system of claim 13, wherein the audible message comprises spoken words.

15. The system of claim 1, wherein the processor unit is further programmed to store position data regarding the determined geographical position in the memory unit at predetermined time intervals.

16. The system of claim 1, wherein the processor unit is further programmed to:

receive updated position data from the navigational unit after the navigational unit is initialized, the updated position data regarding an updated geographical position of the vehicle;

store the updated position data in the memory unit; and use the updated position data to filter a second portion of the event information updates, the second portion of the event information updates being received by the receiver after the navigation unit is initialized.

* * * * *